United States Patent
Nakamura

(10) Patent No.: US 9,995,931 B2
(45) Date of Patent: Jun. 12, 2018

(54) METHOD FOR CORRECTING CONTOUR DISTORTIONS OF LENSES

(71) Applicant: Hitachi Kokusai Electric, Inc., Minato-ku, Tokyo (JP)

(72) Inventor: Kazuhiko Nakamura, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 0 days. days.

(21) Appl. No.: 15/464,901

(22) Filed: Mar. 21, 2017

(65) Prior Publication Data

US 2017/0192229 A1    Jul. 6, 2017

Related U.S. Application Data

(63) Continuation-in-part of application No. PCT/JP2015/074679, filed on Aug. 31, 2015.

(30) Foreign Application Priority Data

Sep. 26, 2014    (JP) .................................. 2014-196595

(51) Int. Cl.
 *G02B 27/00* (2006.01)
 *G02B 17/02* (2006.01)
 (Continued)

(52) U.S. Cl.
 CPC ......... *G02B 27/0068* (2013.01); *G02B 17/02* (2013.01); *H04N 5/04* (2013.01);
 (Continued)

(58) Field of Classification Search
 CPC .... G02B 27/0068; G02B 17/02; H04N 9/045; H04N 9/646; H04N 5/04; H04N 2209/042
 See application file for complete search history.

(56) References Cited

U.S. PATENT DOCUMENTS 6,646,760 B1 * 11/2003 Hanihara ................ G06T 5/006
358/1.9
2003/0122938 A1    7/2003 Yoshida
(Continued)

FOREIGN PATENT DOCUMENTS

JP    2003-198880 A    7/2003
JP    2007-206967 A    8/2007
(Continued)

OTHER PUBLICATIONS

International Search Report and Written Opinion from International Application No. PCT/JP2015/074679 dated Nov. 24, 2015.

*Primary Examiner* — Shahbaz Nazrul
(74) *Attorney, Agent, or Firm* — Brundidge & Stanger, P.C.

(57) ABSTRACT

An imaging device is implemented that corrects contour distortion of the telephoto and wide-angle ends of zoom lens and a reflex lens where the way the contour is distorted significantly differs between the centerward and receding directions. A UHDTV imaging device with a landscape aspect ratio such as 16:9 uses a high-power zoom lens or a reflex lens, obtains type information and aperture ratio information of the lens, obtains and stores coma aberration information of the lens, and individually and independently calculates the amounts of left and right horizontal contour correction in proportion to a distance from the center of a screen (h−H/2), based on the obtained type information and aperture ratio information of the lens and the stored coma aberration information, and individually and independently performs left and right horizontal contour correction, using one of multi-stage horizontal contour correction, multi-stage vertical contour correction, and multi-stage oblique contour correction.

5 Claims, 18 Drawing Sheets

(51) Int. Cl.
  *H04N 9/04* (2006.01)
  *H04N 9/64* (2006.01)
  *H04N 5/04* (2006.01)
(52) U.S. Cl.
  CPC ............ *H04N 9/045* (2013.01); *H04N 9/646* (2013.01); *H04N 2209/042* (2013.01)

(56) References Cited

U.S. PATENT DOCUMENTS

2009/0310225 A1\* 12/2009 Matsusaka ........... G02B 15/177
  359/676
2010/0265380 A1\* 10/2010 Fukuta ................ G02B 15/177
  348/335
2013/0027603 A1\* 1/2013 Maezawa ........... G02B 17/0808
  348/335

FOREIGN PATENT DOCUMENTS

JP     2014-53700 A    3/2014
WO    2014/112622 A1   7/2014

\* cited by examiner

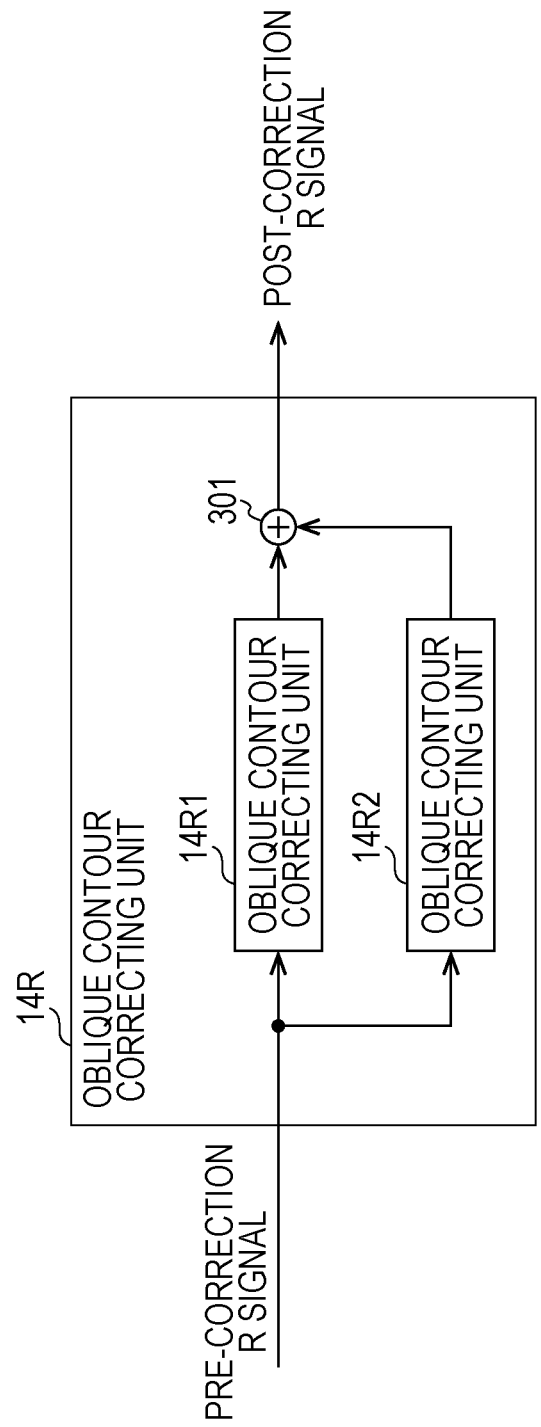

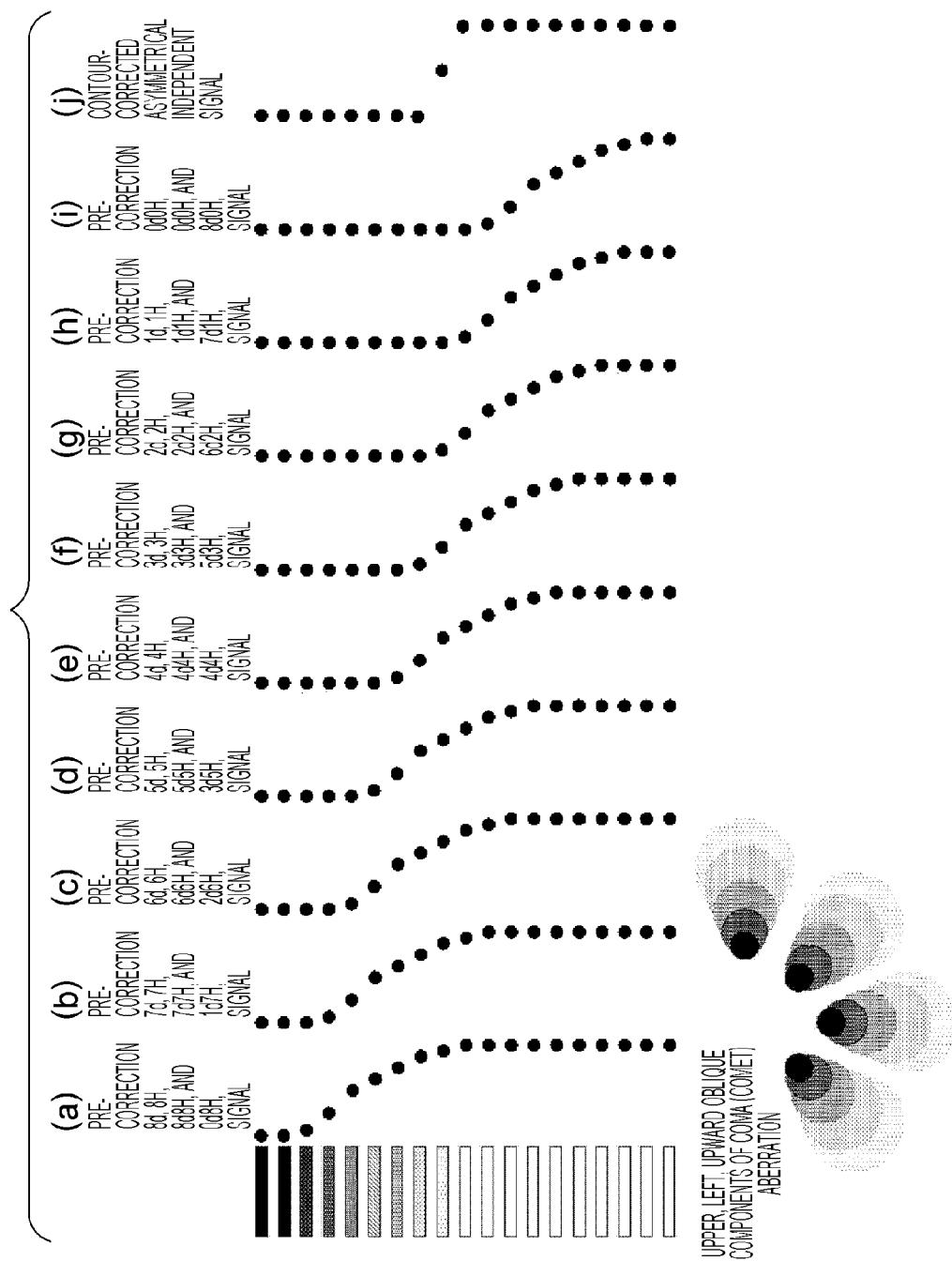

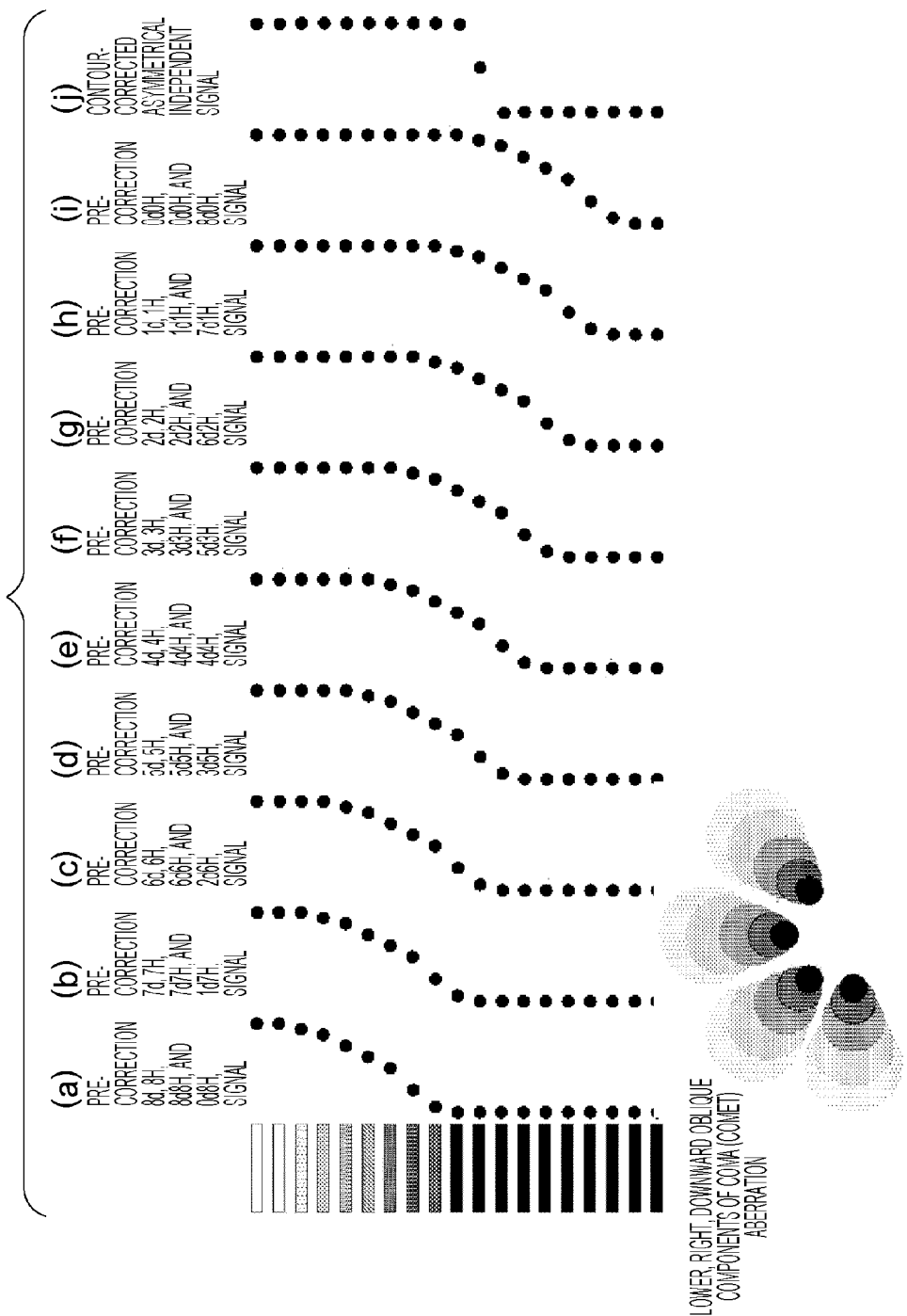

FIG. 2C

|  | −2d | −1d | 0d | +1d | +2d |
|---|---|---|---|---|---|
| 0H | ○ |  |  |  | ○ |
| 1H |  | ○ |  | ○ |  |
| 2H |  |  | ● |  |  |
| 3H |  | ○ |  | ○ |  |
| 4H | ○ |  |  |  | ○ |

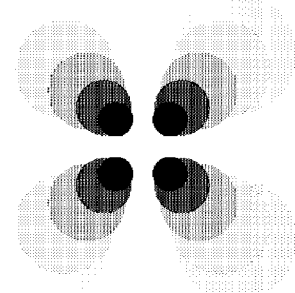
OBLIQUE COMPONENTS OF COMA (COMET) ABERRATION (a) DIAGRAM FOR SUPPLEMENTARY ILLUSTRATION OF OBLIQUES IN TWO DIRECTIONS OF FIG. 1E

|  | 0d | 1d | 2d | 3d | 4d | 5d | 6d | 7d | 8d |
|---|---|---|---|---|---|---|---|---|---|
| 0H |  |  |  |  |  |  |  |  | ○ |
| 1H |  |  |  |  |  |  |  | ○ |  |
| 2H |  |  |  |  |  |  | ○ |  |  |
| 3H |  |  |  |  |  | ○ |  |  |  |
| 4H |  |  |  |  | ● |  |  |  |  |
| 5H |  |  |  | ○ |  |  |  |  |  |
| 6H |  |  | ○ |  |  |  |  |  |  |
| 7H |  | ○ |  |  |  |  |  |  |  |
| 8H | ○ |  |  |  |  |  |  |  |  |

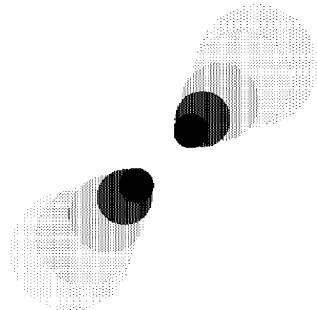
OBLIQUE COMPONENTS OF COMA (COMET) ABERRATION (b) DIAGRAM FOR SUPPLEMENTARY ILLUSTRATION OF UPPER RIGHT OBLIQUE OF FIG. 1G

|  | 0d | 1d | 2d | 3d | 4d | 5d | 6d | 7d | 8d |
|---|---|---|---|---|---|---|---|---|---|
| 0H | ○ |  |  |  |  |  |  |  |  |
| 1H |  | ○ |  |  |  |  |  |  |  |
| 2H |  |  | ○ |  |  |  |  |  |  |
| 3H |  |  |  | ○ |  |  |  |  |  |
| 4H |  |  |  |  | ● |  |  |  |  |
| 5H |  |  |  |  |  | ○ |  |  |  |
| 6H |  |  |  |  |  |  | ○ |  |  |
| 7H |  |  |  |  |  |  |  | ○ |  |
| 8H |  |  |  |  |  |  |  |  | ○ |

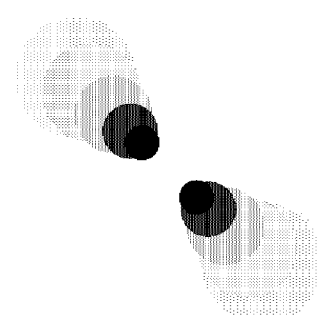
OBLIQUE COMPONENTS OF COMA (COMET) ABERRATION (c) DIAGRAM FOR SUPPLEMENTARY ILLUSTRATION OF UPPER LEFT OBLIQUE OF FIG. 1H

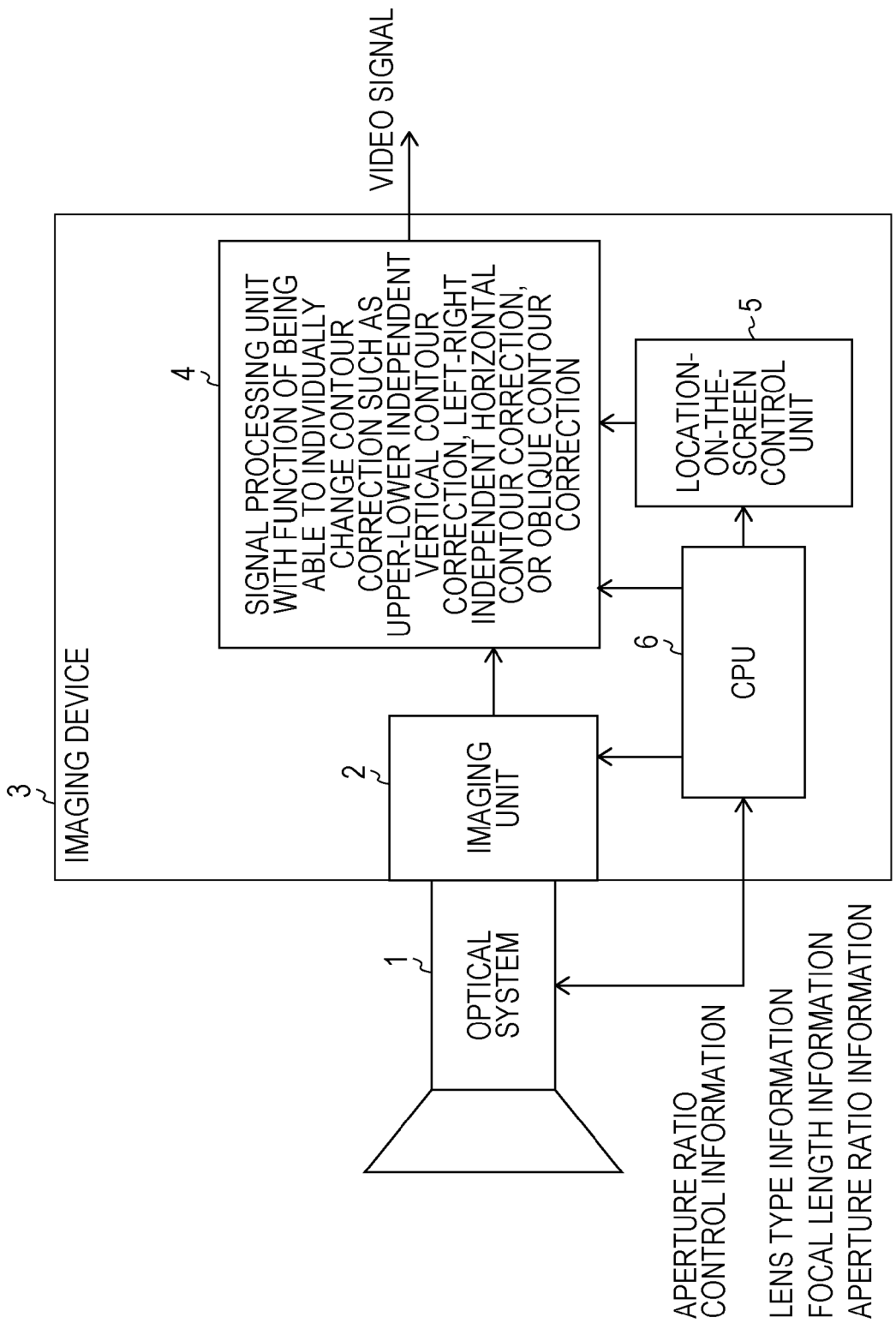

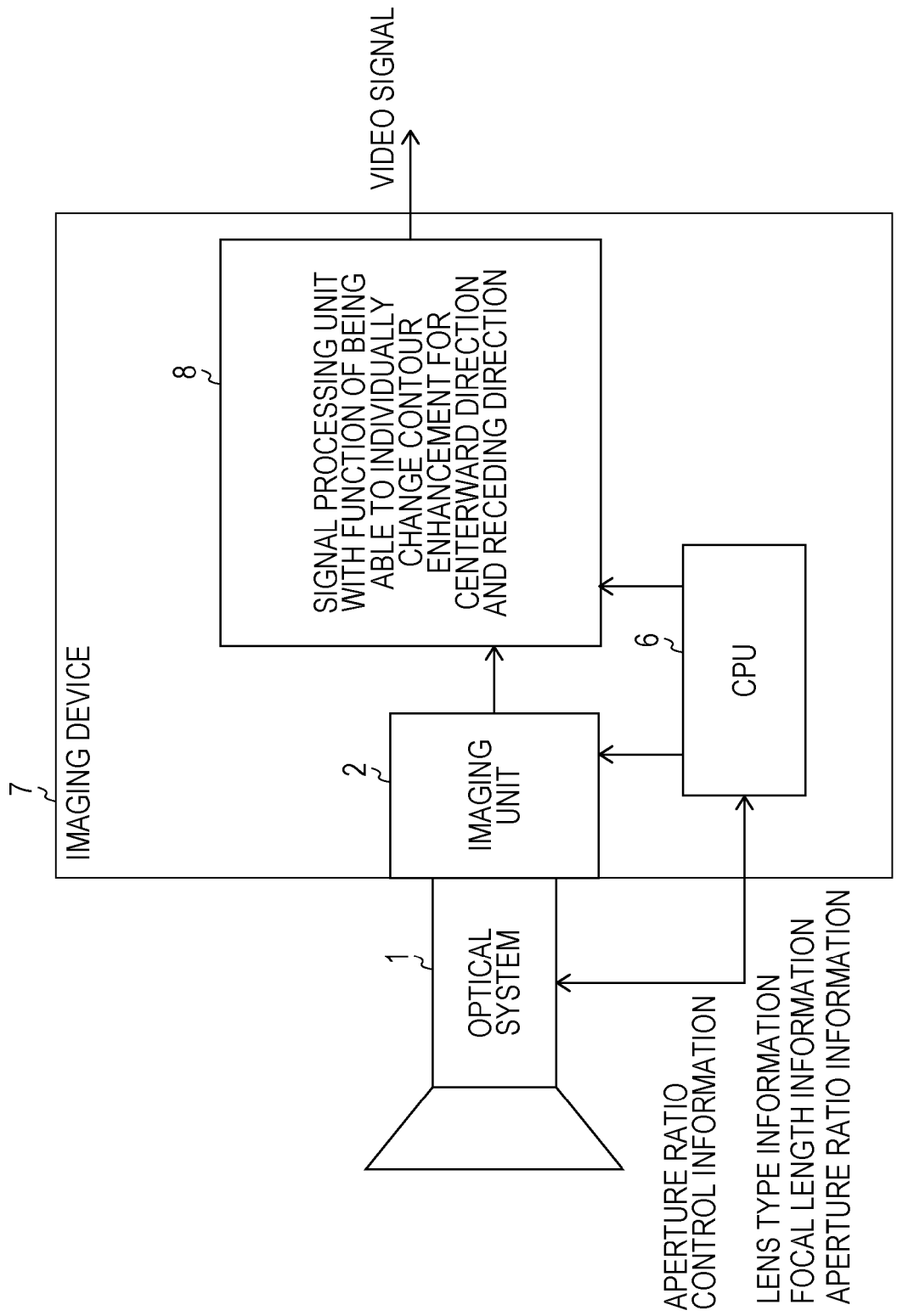

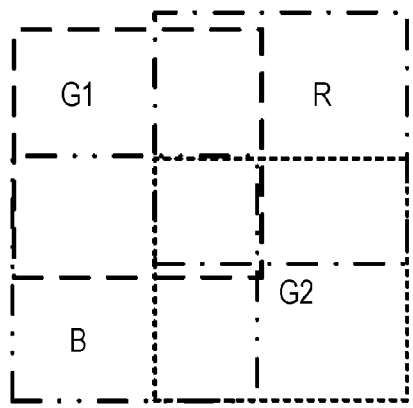
(a) CORRESPONDING TO BAYER PATTERN
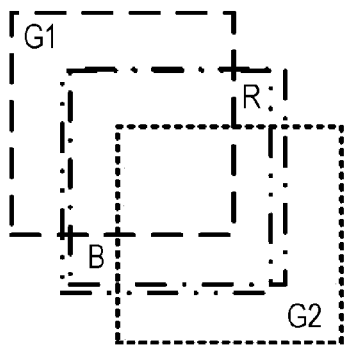
(b) ONLY G1 AND G2 ARE OBLIQUELY SHIFTED BY HALF PIXEL
FIG. 6A
FIG. 6B
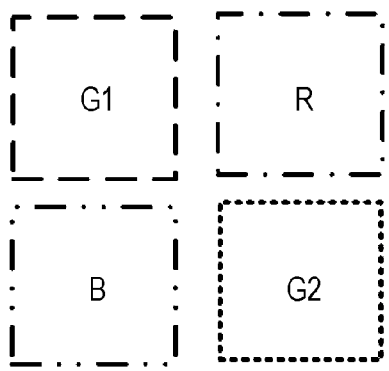
BAYER PATTERN

METHOD FOR CORRECTING CONTOUR DISTORTIONS OF LENSES

CROSS-REFERENCE TO RELATED APPLICATION

The present application is a continuation-in-part application under 35 U.S.C § 111(a) of International Application No. PCT/JP2015/074679, filed Aug. 31, 2015, which claims priority to Japanese Patent Application No. 2014-196595, filed Sep. 26, 2014. The contents of these applications are incorporated herein by reference in their entirety.

TECHNICAL FIELD

The present invention relates to an improvement in an imaging device using a solid-state imaging element and in an imaging method.

BACKGROUND ART

An analog front end (AFE) is widely used. The AFE includes correlated double sampling (CDS) that removes noise from a signal outputted from a charge coupled device (CCD) imaging element; dark current correction; automatic gain control (hereinafter, AGC); and an analog digital converter (ADC) that converts the signal to a digital video signal Vi. The ADC grayscale of the AFE is conventionally 10 bits, but 12 bits and 14 bits have become common. Furthermore, there has been advanced improvement in a complementary metal oxide semiconductor (CMOS) imaging element that allows high-speed reading by integrating a drive circuit and a read circuit.

Furthermore, with the advancement of integration of a digital signal processing circuit, not only a memory-integrated digital signal processor (DSP) dedicated for video, but also an inexpensive, generic field programmable gate array (FPGA) can easily implement the storing of output signals from a plurality of lines and the performing of arithmetic processing. Megapixel cameras with over one million pixels, high definition television (HDTV) cameras, high-speed imaging HDTV cameras, HDTV cameras with a recording unit, HDTV cameras with an Internet Protocol (hereinafter, IP) transmitting unit, ultra-high definition televisions (UHDTVs) for higher definition 2K×4K cameras or 4K×8K cameras, and uncompressed recording devices using a hard disk drive (HDD) have also been put into commercial production. For two-dimensional video display devices, too, there has been advancement in higher definition 2K×4K or 4K×8K UHDTV display, high-speed display, and ultra-slimming down.

Since the refractive index of the lens varies depending on the wavelength of light, the focal length also varies depending on the wavelength of light. Since the focal length of the lens varies depending on the wavelength, there occur axial chromatic aberration where the position of an image plane is shifted back and forth depending on the color, and magnification chromatic aberration where the magnification of an image varies depending on the color and thus the size of an image varies depending on the color.

In addition, due to spherical aberration where the position in an optical axis direction of a focal point varies depending on the distance of an incident point from an optical axis, the modulation factor of the entire screen is reduced. Due to coma (comet-like) aberration where light emerging from one point outside the optical axis does not converge to a single point on the image plane, a formed image is spread out on one side in a radial direction like a coma (comet). Thus, on the periphery of a screen, the way the contour is distorted differs between the outward and inward radial directions. Furthermore, due to astigmatism where an image point in a concentric direction and an image point in a radial direction by a ray of light emerging from one point outside the optical axis are shifted from each other, on the periphery of the screen, the way the contour is distorted in the circumferential direction differs from the way the contour is distorted in the radial direction.

The spherical aberration is proportional to the third power of the numerical aperture (NA) and independent of the size of the field of view, and is the one and only aberration that appears even at the center of the screen. The spherical aberration of a lens doublet composed of two lenses in which the refractive index of a concave lens is higher than that of a convex lens is reduced by one digit or more over a single lens. In addition, the coma aberration is proportional to the second power of the open area ratio NA which is the reciprocal of the aperture ratio F, and to the first power of the size of the field of view, and on the periphery of the screen, the way the contour is distorted differs between the outward and inward radial directions. In addition, the astigmatism is proportional to the first power of NA and to the second power of the size of the field of view.

A phenomenon where light collected by a lens does not focus on a single point is called aberration, and a lens that is corrected for spherical aberration and coma aberration among aberrations is called an aplanat, and furthermore, a lens in which a focal position shift caused by different wavelengths of light is corrected at two locations, i.e., the red C-line (656.3 nm) and the blue F-line (486.1 nm), is called an achromat which is an achromatic lens. A lens that satisfies conditions that, for example, chromatic aberration is corrected at three wavelengths where the violet g-line (435.8 nm) is further added, and spherical aberration and coma aberration are corrected at two wavelengths is named as an apochromat by Abbe.

A high-power zoom lens (e.g., an 88× box or 42× cylindrical zoom lens) that is often used in relay broadcasting is easy to correct for spherical aberration and coma aberration at two wavelengths for an intermediate focal length, but is difficult to correct for spherical aberration and coma aberration at two wavelengths for the wide-angle and telephoto ends. A lens corrected for spherical aberration and coma aberration at three wavelengths is large in size and expensive, like a lens for movies, even for a unifocal lens or a low-power zoom lens. A high-power zoom lens that is corrected for spherical aberration and coma aberration at three wavelengths is very large in size and very expensive and thus has not been put into commercial production.

A lens that is not even an aplanat due to its insufficient correction of spherical aberration and that has a reduced modulation factor even at the center of the screen is insufficient in performance for UHDTVs.

Meanwhile, remaining aberration varies by different aberration correction methods.

In addition, a catoptric system uses reflection of light by a mirror, instead of using refraction of light by glass like a lens. As a result, it is easier for the catoptric system to achieve a large aperture and a high resolution than it is for an optical system including only a lens. Hence, the catoptric system has started to be heavily used not only in large-aperture reflecting telescopes having an aperture on the order of 0.2 m to 10 m and ultra-telephoto reflex lenses for single-lens reflex cameras that have a focal length on the order of 500 mm to 2000 mm, but also in optical systems for semiconductor pattern printing that use an ArF laser with a wavelength of 193 nm or use extreme ultraviolet light with a wavelength of 10 nm or less. However, the catoptric system such as a reflecting telescope does not have chromatic aberration but has coma aberration regardless of whether it is of a Newtonian or Cassegrain type. Thus, if a lens that corrects coma aberration is added to the catoptric system, it becomes large in size and expensive.

Meanwhile, in an imaging device including a lens, an imaging element, and a video signal processing circuit having a contour correction function, there are eight or more line memories, a vertical contour correction signal is generated from each of a plurality of video signals which are delayed by an integer horizontal period, there are eight or more pixel delay functions, a horizontal contour correction signal is generated from each of a plurality of video signals which are delayed by an integer pixel quantity, and upon checking, the vertical contour correction signals and the horizontal contour correction signals are added to the video signals (see Patent Literature 1).

In addition, there is also an imaging device that performs an image sharpening process such as an aperture correction process or an edge enhancement process only for a concentric direction of an image having been subjected to distortion aberration correction by image processing, and does not perform the image sharpening process for a radial direction of the image (see Patent Literature 2).

CITATION LIST

Patent Literature

Patent Literature 1: WO 2014/112622 A1
Patent Literature 2: JP 2014-53700 A

SUMMARY OF INVENTION

Technical Problem

An object of the present invention is to implement an imaging method and an imaging device that electronically correct coma aberration of an optical system in an imaging device that uses a lens where a formed image is spread out on one side in a radial direction like a coma (comet). For example, in a zoom lens that is corrected for chromatic aberration at three wavelengths and corrected for spherical aberration which is independent of the size of the field of view, even if the lens is corrected at the intermediate focal length for coma aberration which is proportional to the first power of the size of the field of view in light of two wavelengths such as red and green, the lens is insufficiently corrected at the wide-angle and telephoto ends for coma aberration which is proportional to the first power of the size of the field of view. Particularly, in light of one wavelength such as blue, coma aberration correction is insufficient and thus the way the contour is distorted differs between the outward and inward radial directions. In addition, a catoptric system that is easy to achieve a large aperture and high resolution does not have chromatic aberration but has coma aberration. Hence, an object of the present invention is to correct coma aberration at the wide-angle and telephoto ends of the zoom lens and coma aberration of the catoptric system.

Solution to Problem

To attain the above-described object, in the present invention, an imaging method for a high-resolution imaging device (e.g., a television camera that has a wide aspect ratio such as 16:9 or 2:1 and that is at least HD such as 1K, 2K, 4K, or 8K) includes:

using an optical system including a lens and a catoptric system, obtaining type information and aperture ratio information of the optical system including a lens and a catoptric system, obtaining and storing coma aberration information of the optical system including a lens and a catoptric system;

using at least one of multi-stage (multi-pixel delay) horizontal contour correction, multi-stage (multi-scanning line delay) vertical contour correction, and multi-stage (frame memory reading) oblique contour correction; and performing at least one individual contour correction for outward and inward radial directions based on the obtained type information and aperture ratio information of the optical system including a lens and a catoptric system and the stored coma aberration information, the at least one individual contour correction being selected from among: individual and independent calculation of amounts of left and right horizontal contour correction and individual and independent performing of left and right horizontal contour correction; individual and independent calculation of amounts of upper and lower vertical contour correction and individual and independent performing of upper and lower vertical contour correction; and individual and independent calculation of amounts of upper left, lower right, upper right, and lower left oblique contour correction and individual and independent performing of upper left, lower right, upper right, and lower left oblique contour correction.

Furthermore, the imaging method performs at least one of:

obtaining focal length information of a zoom lens, too, using multi-stage horizontal contour correction, and individually and independently calculating amounts of left and right horizontal contour correction (at at least the telephoto and wide-angle ends) and individually and independently performing left and right horizontal contour correction, as the individual contour correction for outward and inward radial directions, based on the obtained type information, focal length information, and aperture ratio information of the zoom lens and the stored coma aberration information, the high-resolution imaging device being a wide aspect ratio imaging device, and the optical system including a lens and a catoptric system being the zoom lens corrected for chromatic aberration at three wavelengths;

using multi-stage horizontal contour correction, and individually and independently calculating amounts of left and right horizontal contour correction and individually and independently performing left and right horizontal contour correction, as the individual contour correction for outward and inward radial directions, based on the obtained type information of a reflex lens and the stored coma aberration information, the high-resolution imaging device being a wide aspect ratio imaging device, and the optical system including a lens and a catoptric system being the reflex lens (for a single-lens reflex camera);

performing the individual contour correction for outward and inward radial directions (for at least blue), and generating high-frequency components of a luminance signal using all pixel signals at grid-like spatial locations of an RG1G2B Bayer pattern (using not only RG1G2 but also blue), the high-resolution imaging device using an on-chip color filter imaging element or using a color separation optical system and four or more imaging elements, and using RG1G2B as the spatial locations of a Bayer pattern, and the optical system including a lens and a catoptric system being corrected for chromatic aberration at three wavelengths and corrected for spherical aberration and coma aberration at two wavelengths;

performing the individual contour correction for outward and inward radial directions (for at least blue), and generating high-frequency components of a luminance signal using pixel signals of all colors (red, green, and blue) (using not only red and green but also blue), the high-resolution imaging device using a color separation optical system and three or more imaging elements; and using multi-pixel delay horizontal contour correction and multi-scanning line delay vertical contour correction, using an optical system including a lens (an apochromat named by Abbe) and a catoptric system and corrected for chromatic aberration at three wavelengths (and corrected for spherical aberration and coma aberration at two wavelengths), obtaining type information, focal length information, and aperture ratio information of the optical system including a lens and a catoptric system, obtaining and storing coma aberration information (at least blue coma aberration information appropriate to a focal length and an aperture ratio) of the optical system including a lens and a catoptric system, and individually and independently calculating amounts of left and right horizontal contour correction in proportion to a distance from a center of a screen and individually and independently performing left and right horizontal contour correction, and individually and independently calculating amounts of upper and lower vertical contour correction in proportion to the distance from the center of the screen and individually and independently performing upper and lower vertical contour correction, based on the obtained type information, focal length information, and aperture ratio information of the optical system including a lens and a catoptric system and the stored (at least blue) coma aberration information.

Further, an imaging device includes:

an optical system including a lens and a catoptric system; and means for obtaining type information and aperture ratio information of the optical system including a lens and a catoptric system and obtaining and storing coma aberration information of the optical system including a lens and a catoptric system, the imaging device being a high-resolution imaging device;

at least one of multi-stage (multi-pixel delay) horizontal contour correcting means, multi-stage (multi-scanning line delay) vertical contour correcting means, and multi-stage (frame memory reading) oblique contour correcting means; and at least one means for individually performing contour correction for outward and inward radial directions based on the obtained type information and aperture ratio information of the optical system including a lens and a catoptric system and the stored coma aberration information (at at least the telephoto and wide-angle ends), the at least one means being selected from among: means for individually and independently calculating amounts of left and right horizontal contour correction and individually and independently performing left and right horizontal contour correction; means for individually and independently calculating amounts of upper and lower vertical contour correction and individually and independently performing upper and lower vertical contour correction; and means for individually and independently calculating amounts of upper left, lower right, upper right, and lower left oblique contour correction and individually and independently performing upper left, lower right, upper right, and lower left oblique contour correction.

Furthermore, the imaging device includes at least one of:

combined means including means for obtaining focal length information of a zoom lens, too; means for performing multi-stage horizontal contour correction; and means for individually and independently calculating amounts of left and right horizontal contour correction and individually and independently performing left and right horizontal contour correction, as the contour correction for outward and inward radial directions, based on the obtained type information, focal length information, and aperture ratio information of the zoom lens and the stored coma aberration information, the high-resolution imaging device being a wide aspect ratio imaging device, and the optical system including a lens and a catoptric system being the zoom lens corrected for chromatic aberration at three wavelengths;

combined means including multi-stage horizontal contour correcting means; and means for individually and independently calculating amounts of left and right horizontal contour correction and individually and independently performing left and right horizontal contour correction, as the contour correction for outward and inward radial directions, based on the obtained type information of a reflex lens and the stored coma aberration information, the high-resolution imaging device being a wide aspect ratio imaging device, and the optical system including a lens and a catoptric system being the reflex lens (for a single-lens reflex camera);

combined means including means for individually performing the contour correction for outward and inward radial directions for at least blue; and means for generating high-frequency components of a luminance signal using all pixel signals at grid-like spatial locations of an RG1G2B Bayer pattern, the high-resolution imaging device including an on-chip color filter imaging element or including a color separation optical system and four or more imaging elements, and using RG1G2B as the spatial locations of a Bayer pattern, and the optical system including a lens and a catoptric system being corrected for chromatic aberration at three wavelengths and corrected for spherical aberration and coma aberration at two wavelengths;

combined means including means for individually performing the contour correction for outward and inward radial directions; and means for generating high-frequency components of a luminance signal using pixel signals of all colors (red, green, and blue), the high-resolution imaging device using a color separation optical system and three or more imaging elements; and combined means including multi-pixel delay horizontal contour correcting means; multi-scanning line delay vertical contour correcting means; an optical system including a lens (an apochromat named by Abbe) and a catoptric system and corrected for chromatic aberration at three wavelengths (and corrected for spherical aberration and coma aberration at two wavelengths); means for obtaining type information, focal length information, and aperture ratio information of the optical system including a lens and a catoptric system; means for obtaining and storing coma aberration information (at least blue coma aberration information appropriate to a focal length and an aperture ratio) of the optical system including a lens and a catoptric system; means for individually and independently calculating amounts of left and right horizontal contour correction in proportion to a distance from a center of a screen and individually and independently performing left and right horizontal contour correction, based on the obtained type information, focal length information, and aperture ratio information of the optical system including a lens and a catoptric system and the stored (at least blue) coma aberration information; and means for individually and independently calculating amounts of upper and lower vertical contour correction in proportion to the distance from the center of the screen and individually and independently performing upper and lower vertical contour correction, based on the obtained type information, focal length information, and aperture ratio information of the optical system including a lens and a catoptric system and the stored (at least blue) coma aberration information.

Alternatively, in the present invention for attaining the above-described object, a wide aspect ratio (such as 16:9 or 2:1) imaging device (a high-resolution imaging device such as a television camera that is at least HD such as 1K, 2K, 4K, or 8K) includes: multi-frequency enhancement horizontal contour correction and vertical contour correction, and an optical system including a lens (an apochromat named by Abbe) and a catoptric system and corrected for chromatic aberration at three wavelengths (and corrected for spherical aberration and coma aberration at two wavelengths); means for obtaining type information, focal length information, and aperture ratio information of the optical system including a lens and a catoptric system; means (a CPU 6 and a storage unit provided internally or externally to the CPU 6) for obtaining and storing coma aberration information (at least blue coma aberration information for the apochromat and individual red, green, and blue coma aberration information for the telephoto and wide-angle ends of a zoom lens) appropriate to a focal length and an aperture ratio of the optical system including a lens and a catoptric system; means for individually calculating amounts of horizontal contour correction for a left horizontal contour (5d to 8d contour) and a right horizontal contour (0d to 3d contour) in accordance with a distance of a pixel corresponding to a video signal from a center of a screen (h−H/2 where H is the number of horizontal pixels and h is the horizontal pixel number), based on information on a relationship for contour correction control and (a horizontal pixel number from a horizontal pixel counter based on) a horizontal synchronizing signal and a pixel clock, the information on a relationship being generated (taking into account that the way the contour is distorted due to coma aberration of the optical system including a lens and a catoptric system differs between the outward and inward radial directions) based on the obtained type information, focal length information, and aperture ratio information of the optical system including a lens and a catoptric system and the stored coma aberration information (at least blue coma aberration information for the apochromat and individual red, green, and blue coma aberration information for the telephoto and wide-angle ends of the zoom lens); means (a location-on-the-screen control unit 5 including a horizontal pixel counter) for individually calculating amounts of correction for an upper vertical contour (5H to 8H) and a lower vertical contour (0H to 3H) in accordance with the distance of the pixel from the center of the screen based on the information on a relationship for contour correction control and (a horizontal pixel number from the horizontal pixel counter based on) the horizontal synchronizing signal and the pixel clock; means for individually performing vertical contour correction for the upper vertical contour (5H to 8H) and the lower vertical contour (0H to 3H) and individually performing horizontal contour correction for the left horizontal contour (5d to 8d contour) and the right horizontal contour (0d to 3d contour); and means (the location-on-the-screen control unit 5 including a horizontal pixel counter) for detecting timing for a location on the screen of the video signal based on the horizontal synchronizing signal and the pixel clock (line memory units of FIGS. 1A and 1C and pixel delay units of FIGS. 1B and 1D or frame memory units of FIGS. 1E, 1G, and 1H, and subtractors (negative adders) N0 to N3, N5 to N8, N10 to N13, and N15 to N18 and adders P4 and P14 of FIGS. 1A, 1B, 1C, 1D, 1E, 1G, and 1H). Note that the numbers of subtractors, line memory units, and pixel delay units are preferably seven or more, or four or six.

Alternatively, in the present invention for attaining the above-described object, an imaging device (having a nearly square aspect ratio such as 4:3 or 3:2) (a high-resolution image device such as a television camera that is at least HD such as 1K, 2K, 4K, or 8K) includes: upper right oblique contour correction and upper left oblique contour correction (of FIG. 1D), and an optical system including a lens (an apochromat named by Abbe) and a catoptric system and corrected for chromatic aberration at three wavelengths (and corrected for spherical aberration and coma aberration at two wavelengths); means for obtaining type information, focal length information, and aperture ratio information of the optical system including a lens and a catoptric system; means (a CPU 6 and a storage unit provided internally or externally to the CPU 6) for obtaining and storing coma aberration information (at least blue coma aberration information for the apochromat and individual red, green, and blue coma aberration information for the telephoto and wide-angle ends of a zoom lens) appropriate to a focal length and an aperture ratio of the optical system including a lens and a catoptric system; means (scanning lines and a location-on-the-screen control unit including a horizontal pixel counter) for individually and independently calculating, for each oblique, amounts of upper right oblique contour correction for outward and inward and amounts of upper left oblique contour correction for outward and inward in accordance with a location on a screen proportional to a distance of a pixel corresponding to a video signal from a center of the screen (v−V/2 where V is the number of scanning lines and v is the horizontal pixel number, and h−H/2 where H is the number of horizontal pixels and h is the horizontal pixel number), based on information on a relationship for contour correction control and (a scanning line and a scanning line number and a horizontal pixel number from the horizontal pixel counter based on) a vertical synchronizing signal, a horizontal synchronizing signal, and a pixel clock, the information on a relationship being generated (taking into account that the way the contour is distorted due to coma aberration of the optical system including a lens and a catoptric system (at least blue coma aberration for the apochromat and individual red, green, and blue coma aberration for a common zoom lens and catoptric system) differs between the outward and inward radial directions) based on the obtained type information, focal length information, and aperture ratio information of the optical system including a lens and a catoptric system and the stored coma aberration information (at least blue coma aberration information for the apochromat and individual red, green, and blue coma aberration information for the telephoto and wide-angle ends of the zoom lens); means (the scanning lines and the location-on-the-screen control unit including a horizontal pixel counter) for detecting timing for a location on the screen of the video signal based on the horizontal synchronizing signal and the pixel clock; and means (a frame memory unit, a CPU unit, scanning lines and a location-on-the-screen control unit including a horizontal pixel counter, subtractors (negative adders) N0 to N3, N5 to N8, N10 to N13, and N15 to N18, and adders P4 and P14 of FIGS. 1E, 1G, and 1H) for individually and independently performing, for each oblique, upper right oblique contour correction and upper left oblique contour correction for outward and inward, based on the generated information on a relationship for contour correction control and the detected timing for a location on the screen of the video signal.

Alternatively, in the present invention, a (wide aspect ratio) imaging device that uses an optical system including a lens and a catoptric system and corrected for chromatic aberration at three wavelengths and corrected for spherical aberration and coma aberration at two wavelengths uses multi-pixel delay horizontal contour correction and multi-scanning line delay vertical contour correction; obtains type information, focal length information, and aperture ratio information of the optical system including a lens and a catoptric system; obtains and stores coma aberration information of the optical system including a lens and a catoptric system (at least blue coma aberration information for an apochromat and individual red, green, and blue coma aberration information for the telephoto and wide-angle ends of a zoom lens); individually and independently calculates amounts of vertical contour correction and amounts of horizontal contour correction for the outward and inward radial directions in accordance with a distance of a pixel from a center of a screen (taking into account that the way the contour is distorted due to coma aberration of the optical system including a lens and a catoptric system (at least blue coma aberration for the apochromat and individual red, green, and blue coma aberration for the telephoto and wide-angle ends of the zoom lens and the catoptric system) differs between the outward and inward radial directions) based on the obtained type information, focal length information, and aperture ratio information of the optical system including a lens and a catoptric system and the stored coma aberration information (at least blue coma aberration information for the apochromat and individual red, green, and blue coma aberration information for the telephoto and wide-angle ends of the zoom lens); and individually and independently performs vertical contour correction and horizontal contour correction for the outward and inward radial directions. In addition, the present invention provides an imaging device capable of changing HDTL individually for the left and right locations on a screen and independently for left and right.

Advantageous Effects of Invention

In a solid-state imaging device of the present invention, a lens in which coma aberration proportional to the first power of the size of the field of view of an optical system including a lens and a catoptric system (at least blue for an apochromat, and individual red, green, and blue for the telephoto and wide-angle ends of a zoom lens and the catoptric system) is insufficiently corrected and the way the contour is distorted differs between the outward and inward radial directions is electronically corrected as a video signal, and a video signal having been subjected to contour correction where contour overshoot and undershoot are suppressed in the outward and inward radial directions can be outputted.

Hence, it becomes easier to put affordable cameras including a 4K or 8K lens (particularly, UHDTVs) into commercial production.

BRIEF DESCRIPTION OF DRAWINGS

FIG. 1I is a block diagram for describing the operation of the oblique contour correcting unit which is one embodiment of the present invention.

FIG. 2A is a schematic diagram showing the generation of a multi-scanning line (H) vertical contour correction signal, a multi-pixel horizontal contour correction signal, or an oblique multi-pixel contour correction signal of one embodiment of the present invention (contour correction for greatly distorted rear contour edges) ((a) a pre-correction 8d, 8H, 8d8H, and 0d8H signal, (b) a pre-correction 7d, 7H, 7d7H, and 1d7H signal, (c) a pre-correction 6d, 6H, 6d6H, and 2d6H signal, (d) a pre-correction 5d, 5H, 5d5H, and 3d5H signal, (e) a pre-correction 4d, 4H, 4d4H, and 4d4H signal, (f) a pre-correction 3d, 3H, 3d3H, and 5d3H signal, (g) a pre-correction 2d, 2H, 2d2H, and 6d2H signal, (h) a pre-correction 1d, 1H, 1d1H, and 7d1H signal, (i) a pre-correction 0d0H, 0d0H, and 8d0H signal, and (j) a contour-corrected asymmetrical independent signal).

FIG. 2B is a schematic diagram showing the generation of a multi-scanning line (H) vertical contour correction signal, a multi-pixel horizontal contour correction signal, or an oblique multi-pixel contour correction signal of one embodiment of the present invention (contour correction for greatly distorted front contour edges) ((a) a pre-correction 8d, 8H, 8d8H, and 0d8H signal, (b) a pre-correction 7d, 7H, 7d7H, and 1d7H signal, (c) a pre-correction 6d, 6H, 6d6H, and 2d6H signal, (d) a pre-correction 5d, 5H, 5d5H, and 3d5H signal, (e) a pre-correction 4d, 4H, 4d4H, and 4d4H signal, (f) a pre-correction 3d, 3H, 3d3H, and 5d3H signal, (g) a pre-correction 2d, 2H, 2d2H, and 6d2H signal, (h) a pre-correction 1d, 1H, 1d1H, and 7d1H signal, (i) a pre-correction 0d0H, 0d0H, and 8d0H signal, and (j) a contour-corrected asymmetrical independent signal).

FIG. 2C is a schematic diagram for describing a method of generating an oblique multi-pixel contour correction signal which is one embodiment of the present invention ((a) a diagram for supplementary illustration of obliques in two directions of FIG. 1E, (b) a diagram for supplementary illustration of an upper right oblique of FIG. 1G, and (c) a diagram for supplementary illustration of an upper left oblique of FIG. 1H).

FIG. 4 is a block diagram showing an overall configuration of an imaging device of one embodiment of the present invention.

FIG. 5 is a block diagram showing an overall configuration of an imaging device of conventional art.

FIG. 6A is a schematic diagram showing how pixels of four imaging elements in the imaging device according to one embodiment of the present invention overlap each other at attachment locations ((a) corresponding to a Bayer pattern and (b) only G1 and G2 are obliquely shifted by a half pixel).

FIG. 6B is a schematic diagram showing an arrangement of on-chip color filters of a single imaging element in the imaging device according to one embodiment of the present invention (Bayer pattern).

MODE FOR CARRYING OUT THE INVENTION

Figure 1A:
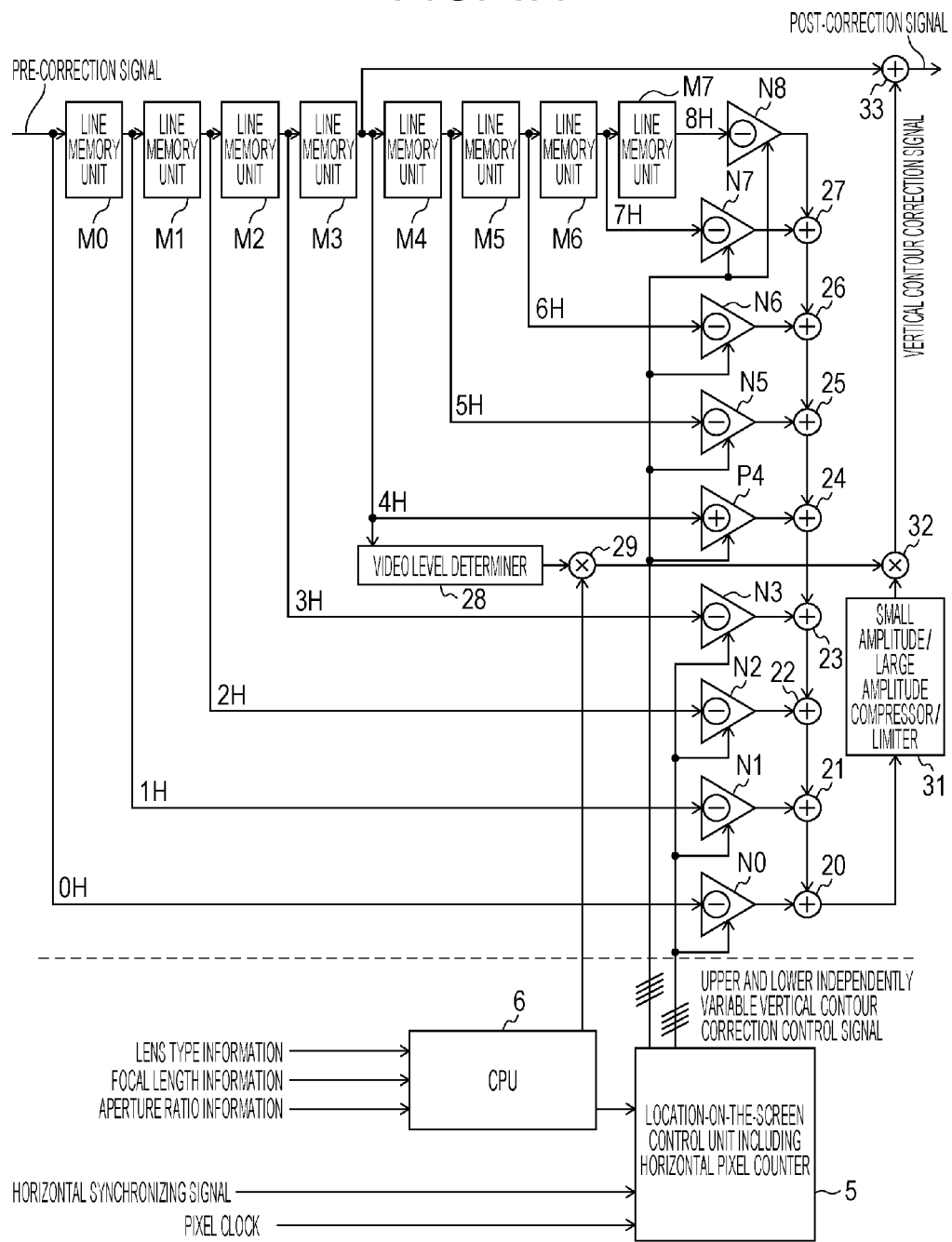
FIG. 1A is a detailed block diagram of a multi-scanning line (H) vertical contour correction circuit of one embodiment of the present invention. The circuit includes cascade connected eight line memories (M0 to M7), for generating a plurality of video signals which are delayed by an integer horizontal period at each connection point; means (CPU 6) for generating information on a relationship between a location on a screen and contour correction control (a horizontal pixel number and the amount of contour correction) based on lens information such as the type information, focal length information, and aperture ratio information of a lens; means (a location-on-the-screen control unit 5 including a horizontal pixel counter) for individually calculating the amounts of correction for a left horizontal contour (5d to 8d contour) and a right horizontal contour (0d to 3d contour) in accordance with a distance of a pixel corresponding to a video signal from the center of the screen (h–H/2 where H is the number of horizontal pixels and h is the horizontal pixel number), and individually calculating the amounts of correction for an upper vertical contour (5H to 8H) and a lower vertical contour (0H to 3H) in accordance with the distance of the pixel from the center of the screen, based on the generated information on a relationship for contour correction control and (a horizontal pixel number from the horizontal pixel counter based on) a horizontal synchronizing signal and a pixel clock; and means (the location-on-the-screen control unit 5 including a horizontal pixel counter) for individually performing vertical contour correction for the upper vertical contour (5H to 8H) and the lower vertical contour (0H to 3H) and individually performing horizontal contour correction for the left horizontal contour (5d to 8d contour) and the right horizontal contour (0d to 3d contour).

The present invention provides an imaging device including:
an optical system including a lens and a catoptric system; and means for obtaining type information and aperture ratio information of the optical system including a lens and a catoptric system and obtaining and storing coma aberration information of the optical system including a lens and a catoptric system, the imaging device being a high-resolution imaging device;
at least one of multi-stage horizontal contour correcting means, multi-stage vertical contour correcting means, and multi-stage oblique contour correcting means; and
at least one means for individually performing contour correction for outward and inward radial directions based on the obtained type information and aperture ratio information of the optical system including a lens and a catoptric system and the stored coma aberration information, the at least one means being selected from among: means for individually and independently calculating amounts of left and right horizontal contour correction and individually and independently performing left and right horizontal contour correction; means for individually and independently calculating amounts of upper and lower vertical contour correction and individually and independently performing upper and lower vertical contour correction; and means for individually and independently calculating amounts of upper left, lower right, upper right, and lower left oblique contour correction and individually and independently performing upper left, lower right, upper right, and lower left oblique contour correction.

Furthermore, the above-described imaging device includes at least one means selected from among:
means for obtaining focal length information of a zoom lens, too; means for performing multi-stage horizontal contour correction; and means for individually and independently calculating amounts of left and right horizontal contour correction and individually and independently performing left and right horizontal contour correction, as the contour correction for outward and inward radial directions, based on the obtained type information, focal length information, and aperture ratio information of the zoom lens and the stored coma aberration information, the high-resolution imaging device being a wide aspect ratio imaging device, and the optical system including a lens and a catoptric system being the zoom lens corrected for chromatic aberration at three wavelengths; and (means for individually performing the contour correction for outward and inward radial directions), and means for generating high-frequency components of a luminance signal using not only RG1G2 but also blue, the high-resolution imaging device including an on-chip color filter imaging element or including a color separation optical system and four or more imaging elements, and using RG1G2B as spatial locations of a Bayer pattern, and the optical system including a lens and a catoptric system being corrected for chromatic aberration at three wavelengths and corrected for spherical aberration and coma aberration at two wavelengths.

First Embodiment

The present invention provides a high-resolution imaging device such as a television camera having a wide aspect ratio such as 16:9 or 2:1 and being at least HD such as 1K, 2K, 4K, or 8K that has multi-pixel delay horizontal contour correction and multi-scanning line delay vertical contour correction and includes at least one of: means for obtaining type information, focal length information, and aperture ratio information of an optical system including a lens and a catoptric system (to individually perform left and right horizontal contour correction and individually perform upper and lower vertical contour correction); means (a CPU 6 and a storage unit provided internally or externally to the CPU 6) for obtaining and storing circumferential direction modulation factor information and radial direction modulation factor information appropriate to a focal length and an aperture ratio of the optical system including a lens and a catoptric system; means (a location-on-the-screen control unit 5 including a horizontal pixel counter) for individually calculating the amounts of correction for a left horizontal contour (5d to 8d contour) and a right horizontal contour (0d to 3d contour) in accordance with a distance of a pixel corresponding to a video signal from the center of a screen (h−H/2 where H is the number of horizontal pixels and h is the horizontal pixel number), and individually calculating the amounts of correction for an upper vertical contour (5H to 8H) and a lower vertical contour (0H to 3H) in accordance with the distance of the pixel from the center of the screen, based on information on a relationship for contour (modulation factor) correction control and (a horizontal pixel number from the horizontal pixel counter based on) a horizontal synchronizing signal and a pixel clock, the information on a relationship being generated (taking into account that the way the contour is distorted in a centerward direction and the way the contour is distorted in a receding direction due to coma aberration of the optical system including a lens and a catoptric system) based on the obtained type information, focal length information, and aperture ratio information of the optical system including a lens and a catoptric system and the stored circumferential direction modulation factor information and radial direction modulation factor information; means (negative multipliers N0 to N3, N5 to N8, N10 to N13, and N15 to N18 and positive multipliers P0 to P8) for individually performing vertical contour correction for the upper vertical contour (5H to 8H) and the lower vertical contour (0H to 3H) and individually performing horizontal contour correction for the left horizontal contour (5d to 8d contour) and the right horizontal contour (0d to 3d contour); and means for making the upper and lower contour correction differ from the left and right contour correction by making the upper and lower vertical contour correction variable independently and making the left and right horizontal contour correction variable independently as going away to the left and right from the center of the screen, taking into account the way the contour is distorted in the centerward direction and the way the contour is distorted in the receding direction due to the coma aberration of the optical system including a lens and a catoptric system.

Figure 1B:
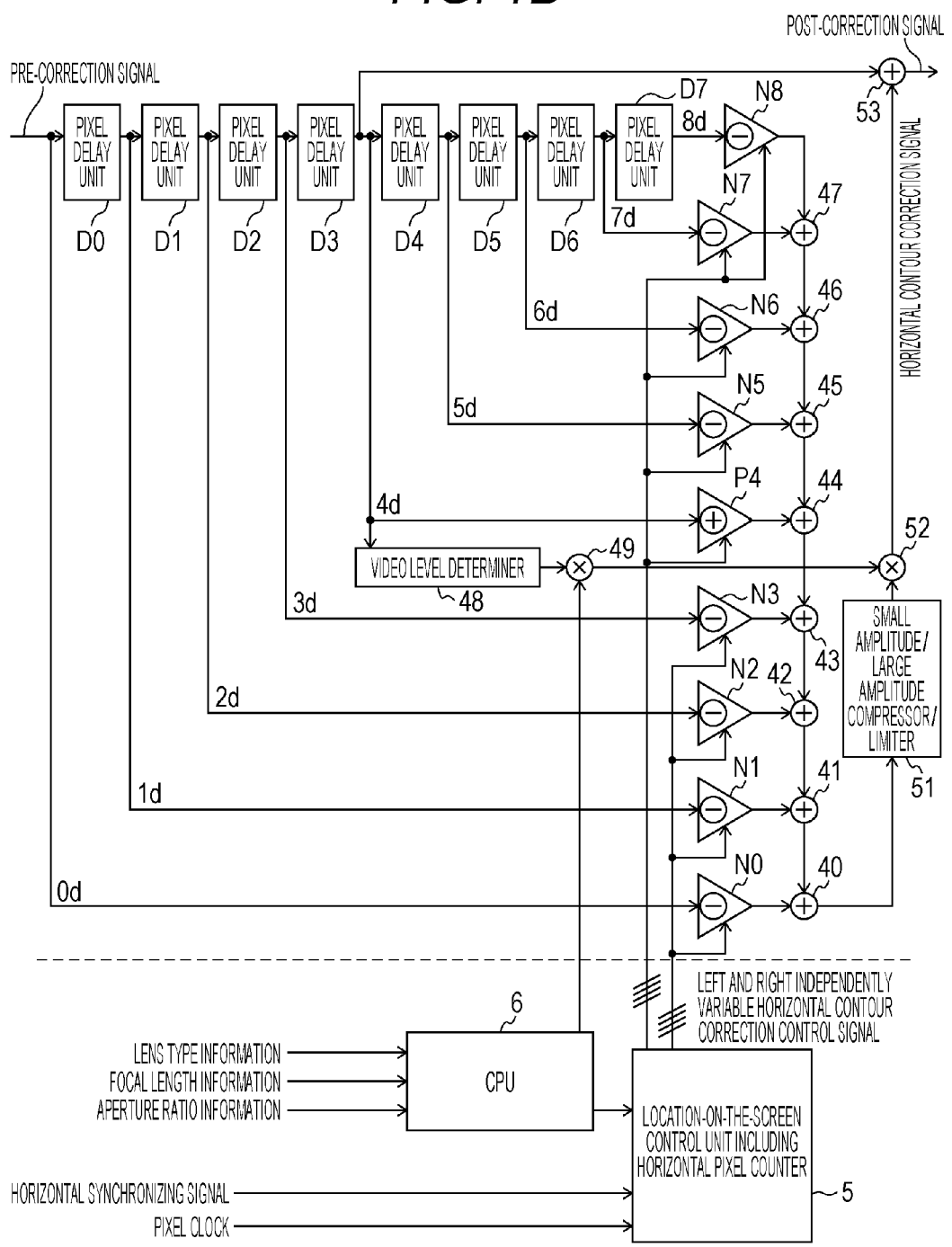
FIG. 1B is a detailed block diagram of a multi-pixel horizontal contour correction circuit of one embodiment of the present invention. The circuit includes cascade connected eight pixel delay units (D0 to D7), for generating a plurality of video signals which are delayed by an integer pixel quantity at each connection point.
Figure 1C:
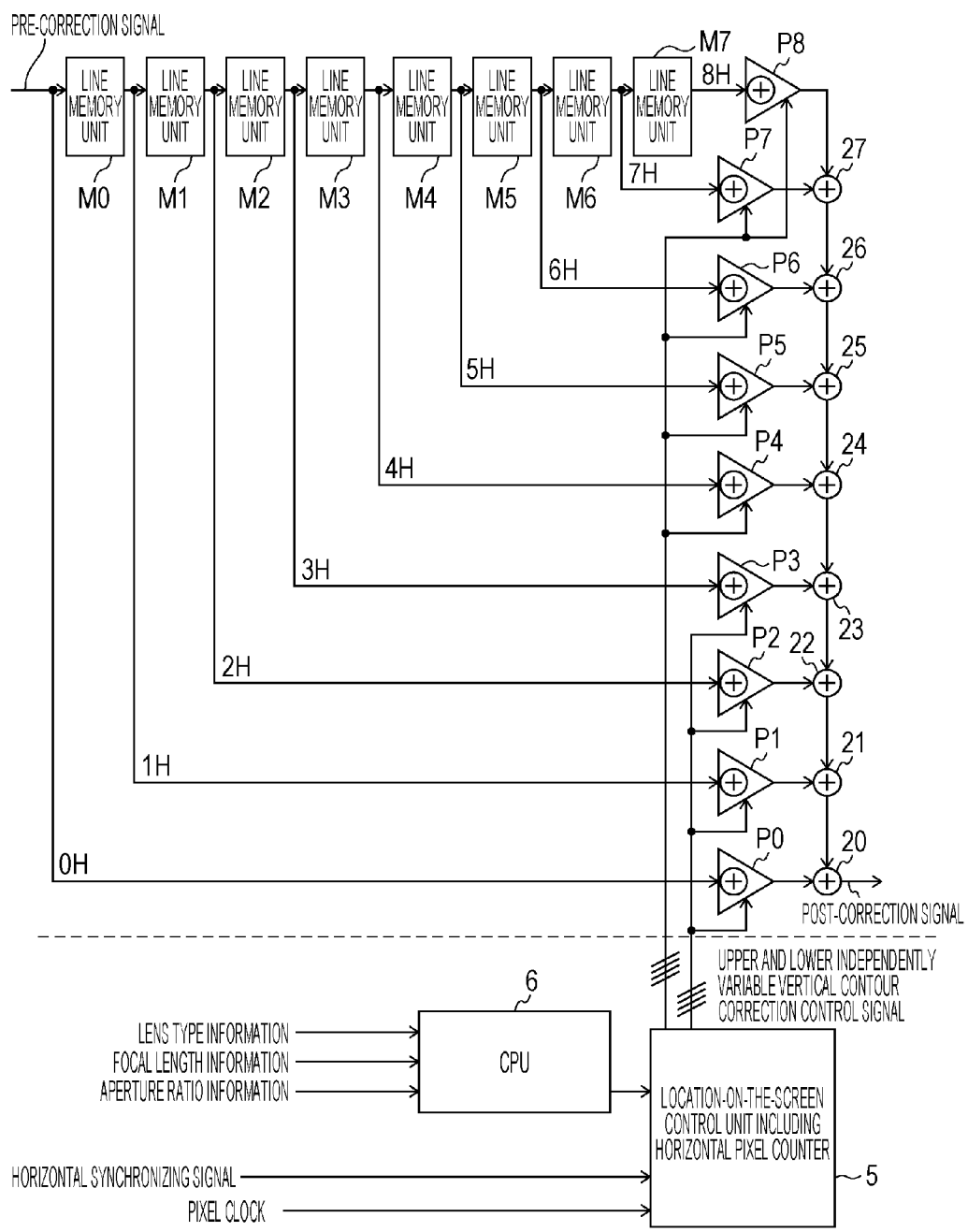
FIG. 1C is a detailed block diagram of a multi-scanning line (H) vertical contour correction circuit of one embodiment of the present invention (a contour correction signal is generated by the addition and subtraction of read signals from a frame memory).

In FIGS. 1A, 1B, and 1C which are detailed block diagrams of multi-scanning line (H) vertical contour correction circuits of one embodiment of the present invention, the circuits include means (CPU 6) for generating, based on information on an optical system including a lens and a catoptric system, e.g., the type information, focal length information, and aperture ratio information of the optical system including a lens and a catoptric system, information on a relationship between a location on a screen and contour correction control (a horizontal pixel number and the amounts of frequency correction for contour correction), taking into account that the way the contour edge is distorted differs between the centerward and outward radial directions of the optical system including a lens and a catoptric system; means (a location-on-the-screen control unit 5 including a horizontal pixel counter) for individually calculating the amounts of correction for a left horizontal contour (5d to 8d contour) and a right horizontal contour (0d to 3d contour) in accordance with a distance of a pixel corresponding to a video signal from the center of the screen (h−H/2 where H is the number of horizontal pixels and h is the horizontal pixel number), and individually calculating the amounts of correction for an upper vertical contour (5H to 8H) and a lower vertical contour (0H to 3H) in accordance with the distance of the pixel from the center of the screen, based on the generated information on a relationship for contour correction control and (a horizontal pixel number from the horizontal pixel counter based on) a horizontal synchronizing signal and a pixel clock; and means (negative multipliers N0 to N3 and N5 to N8 and positive multipliers P0 to P8) for individually performing vertical contour correction for the upper vertical contour (5H to 8H) and the lower vertical contour (0H to 3H) and individually performing horizontal contour correction for the left horizontal contour (5d to 8d contour) and the right horizontal contour (0d to 3d contour).

In addition, one embodiment of the present invention will be described using FIG. 4 which is a block diagram showing an overall configuration of an imaging device of one embodiment of the present invention, FIG. 1A which is a detailed block diagram of a multi-scanning line (H) vertical contour correction circuit of one embodiment of the present invention, FIG. 1B which is a detailed block diagram of a multi-pixel horizontal contour correction circuit of one embodiment of the present invention, FIG. 1C which is a detailed block diagram of a multi-scanning line (H) vertical contour correction circuit of one embodiment of the present invention, FIG. 1D which is a detailed block diagram of a multi-pixel horizontal contour correction circuit of one embodiment of the present invention, FIG. 2A which is a schematic diagram showing the generation of a multi-scanning line (H) vertical contour correction signal, a multi-pixel horizontal contour correction signal, or an oblique multi-pixel contour correction signal of one embodiment of the present invention (contour correction for greatly distorted rear contour edges), and FIG. 2B which is a schematic diagram showing the generation of a multi-scanning line (H) vertical contour correction signal, a multi-pixel horizontal contour correction signal, or an oblique multi-pixel contour correction signal of one embodiment of the present invention (contour correction for greatly distorted front contour edges).

The difference between FIG. 4 which is a block diagram showing an overall configuration of an imaging device of one embodiment of the present invention and FIG. 5 which is a block diagram showing an overall configuration of an imaging device of conventional art is whether a signal processing unit 4 includes a signal processing unit with an individually variable function that individually performs vertical contour correction for the upper and lower vertical contours and individually performs horizontal contour correction for the left and right horizontal contours.

Figure 3A:
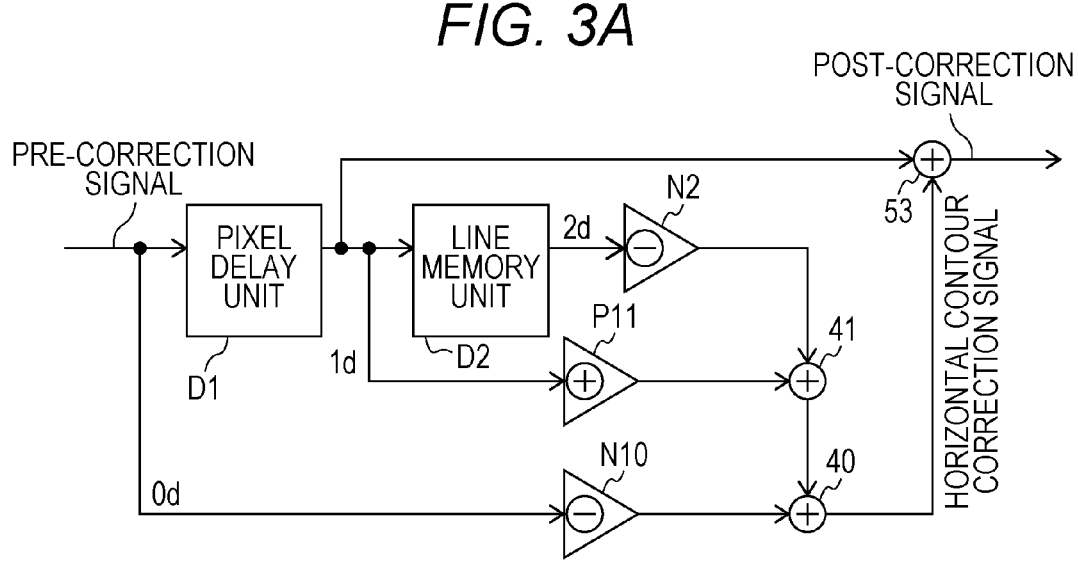
FIGS. 3(a) and (b) are detailed block diagrams of visible-light contour correction signal generating circuits of conventional art ((a) a horizontal contour correction signal generating circuit and (b) a vertical contour correction signal generating circuit).
Figure 3B:
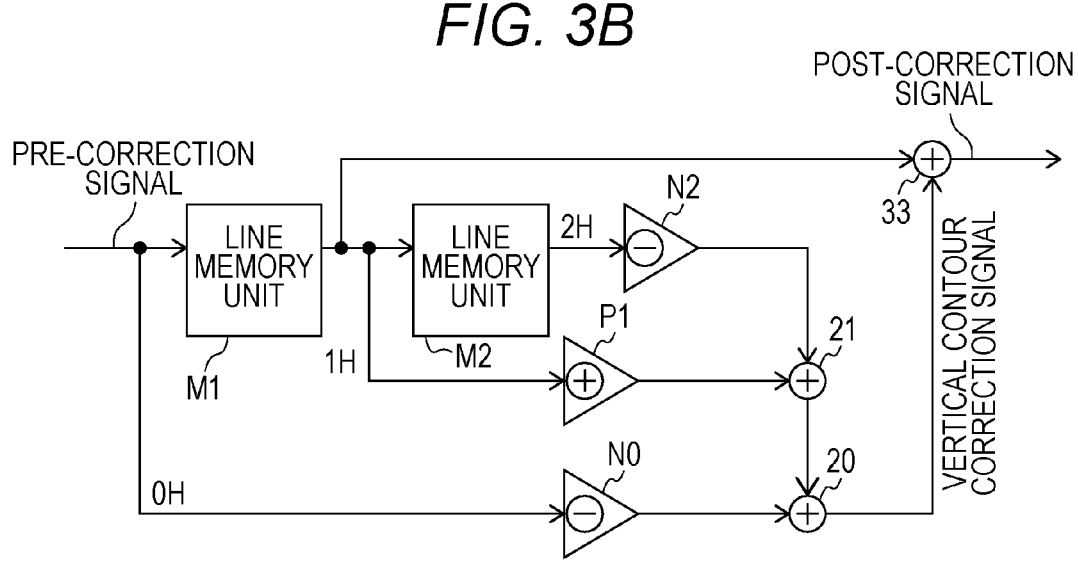

The differences between FIG. 1A which is a detailed block diagram of a multi-scanning line (H) vertical contour correction circuit of one embodiment of the present invention, FIG. 1B which is a detailed block diagram of a multi-pixel horizontal contour correction circuit of one embodiment of the present invention, and FIG. 3(b) which is a detailed block diagram of a visible-light vertical contour correction signal generating circuit of conventional art are not only the number of line memories, the number of multipliers, and the number of adders, but also that the multi-scanning line (H) vertical contour correction circuit and the multi-pixel horizontal contour correction circuit include means (CPU 6) for generating, based on information on an optical system including a lens and a catoptric system, such as the type information, focal length information, and aperture ratio information of the optical system including a lens and a catoptric system, information on a relationship between a location on a screen and contour correction control (a horizontal pixel number and the amounts of frequency correction for contour correction), taking into account that the way the contour edge is distorted in a centerward radial direction of the optical system including a lens and a catoptric system differs from the way the contour edge is distorted in an outward radial direction; means (a location-on-the-screen control unit 5 including a horizontal pixel counter) for individually calculating the amounts of correction for a left horizontal contour (5d to 8d contour) and a right horizontal contour (0d to 3d contour) and individually calculating the amounts of correction for an upper vertical contour (5H to 8H) and a lower vertical contour (0H to 3H), in proportion to a distance of a pixel corresponding to a video signal from the center of the screen (h−H/2 where H is the number of horizontal pixels and h is the horizontal pixel number), based on the generated information on a relationship for contour correction control and (a horizontal pixel number from the horizontal pixel counter based on) a horizontal synchronizing signal and a pixel clock; and means (negative multipliers N0 to N3 and N5 to N8 and a positive multiplier P4) for individually performing vertical contour correction for the upper vertical contour (5H to 8H) and the lower vertical contour (0H to 3H) and individually performing horizontal contour correction for the left horizontal contour (5d to 8d contour) and the right horizontal contour (0d to 3d contour).

In FIG. 4 which is a block diagram showing an overall configuration of an imaging device of one embodiment of the present invention, 1: an optical system including a lens and a catoptric system (particularly, a high-power zoom lens and a reflex lens), 2: an imaging unit, 3: an imaging device, 4: a signal processing unit with a function of being able to individually change contour correction, 5: a location-on-the-screen control unit, and 6: a CPU.

Figure 1D:
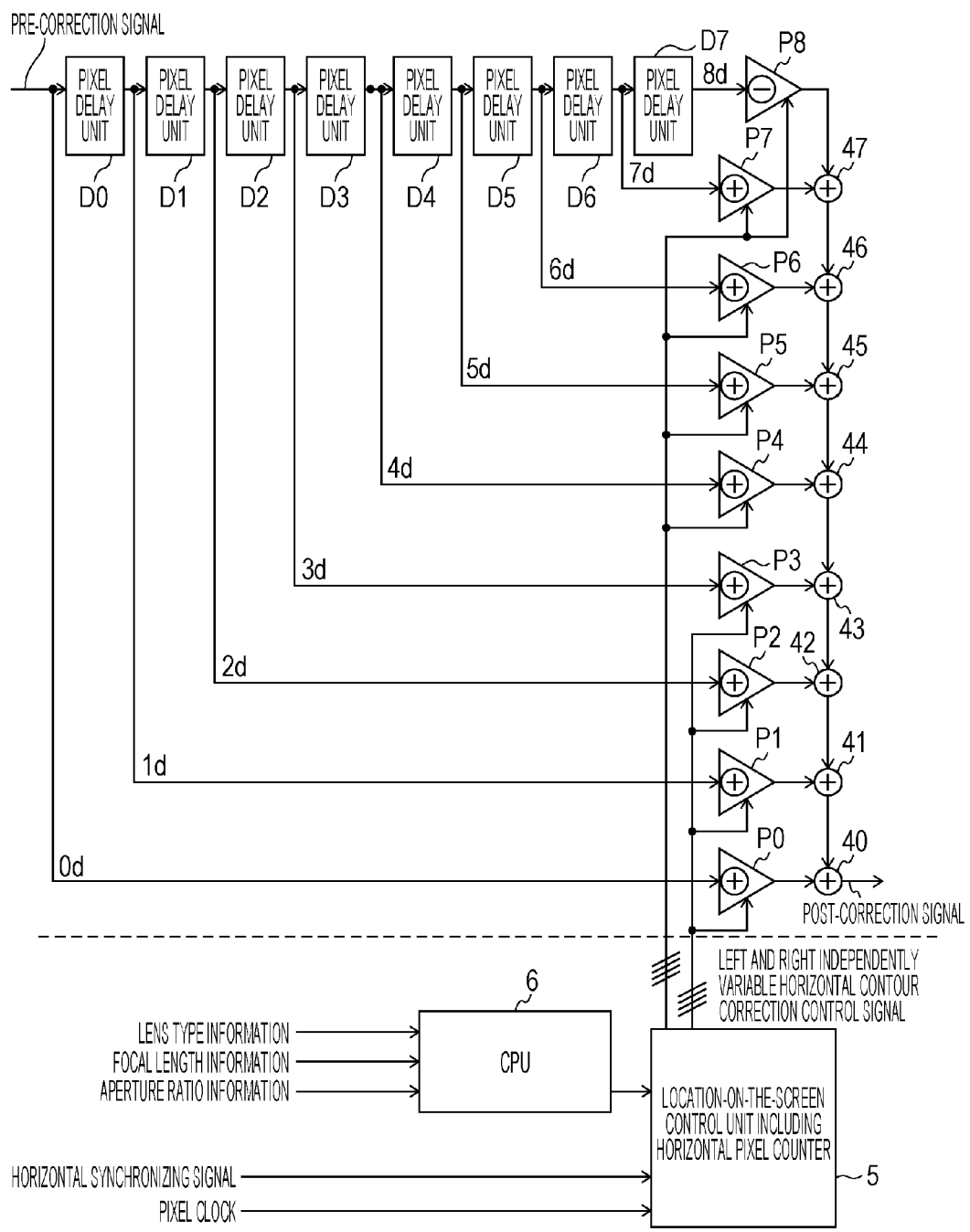
FIG. 1D is a detailed block diagram of a multi-pixel horizontal contour correction circuit of one embodiment of the present invention (a contour correction signal is generated by the addition and subtraction of read signals from a frame memory).

In FIG. 1A which is a detailed block diagram of a multi-scanning line (H) vertical contour correction circuit of one embodiment of the present invention, FIG. 1B which is a detailed block diagram of a multi-pixel horizontal contour correction circuit of one embodiment of the present invention, FIG. 1C which is a detailed block diagram of a multi-scanning line (H) vertical contour correction circuit of one embodiment of the present invention, and FIG. 1D which is a detailed block diagram of a multi-pixel horizontal contour correction circuit of one embodiment of the present invention, 20 to 27 and 40 to 47: an adder, 28 and 48: a video level determiner, 6: a CPU, 31 and 51: a small amplitude/large amplitude compressor/limiter, 29, 49, 32, and 52: a multiplier, M0 to M7: a line memory unit, D0 to D7: a pixel delay unit, N0 to N7: a negative multiplier, and P0 to P8: a positive multiplier.

In FIG. 2A which is a schematic diagram showing the generation of a multi-scanning line (H) vertical contour correction signal, a multi-pixel horizontal contour correction signal, or an oblique multi-pixel contour correction signal of one embodiment of the present invention (contour correction for greatly distorted rear contour edges), (a) shows a pre-correction 8d, 8H, 8d8H, and 0d8H signal, (b) shows a pre-correction 7d, 7H, 7d7H, and 1d7H signal, (c) shows a pre-correction 6d, 6H, 6d6H, and 2d6H signal, (d) shows a pre-correction 5d, 5H, 5d5H, and 3d5H signal, (e) shows a pre-correction 4d, 4H, 4d4H, and 4d4H signal, (f) shows a pre-correction 3d, 3H, 3d3H, and 5d3H signal, (g) shows a pre-correction 2d, 2H, 2d2H, and 6d2H signal, (h) shows a pre-correction 1d, 1H, 1d1H, and 7d1H signal, (i) shows a pre-correction 0d0H, 0d0H, and 8d0H signal, and (j) shows a contour-corrected asymmetrical independent signal.

In FIG. 2B which is a schematic diagram showing the generation of a multi-scanning line (H) vertical contour correction signal, a multi-pixel horizontal contour correction signal, or an oblique multi-pixel contour correction signal of one embodiment of the present invention (contour correction for greatly distorted front contour edges), (a) shows a pre-correction 8d, 8H, 8d8H, and 0d8H signal, (b) shows a pre-correction 7d, 7H, 7d7H, and 1d7H signal, (c) shows a pre-correction 6d, 6H, 6d6H, and 2d6H signal, (d) shows a pre-correction 5d, 5H, 5d5H, and 3d5H signal, (e) shows a pre-correction 4d, 4H, 4d4H, and 4d4H signal, (f) shows a pre-correction 3d, 3H, 3d3H, and 5d3H signal, (g) shows a pre-correction 2d, 2H, 2d2H, and 6d2H signal, (h) shows a pre-correction 1d, 1H, 1d1H, and 7d1H signal, (i) shows a pre-correction 0d0H, 0d0H, and 8d0H signal, and (j) shows a contour-corrected asymmetrical independent signal.

That is, in the present invention, in FIG. 2A, by individually subtracting (a) a pre-correction 8d, 8H, 8d8H, and 0d8H signal, (b) a pre-correction 7d, 7H, 7d7H, and 1d7H signal, (c) a pre-correction 6d, 6H, 6d6H, and 2d6H signal, (d) a pre-correction 5d, 5H, 5d5H, and 3d5H signal, (f) a pre-correction 3d, 3H, 3d3H, and 5d3H signal, (g) a pre-correction 2d, 2H, 2d2H, and 6d2H signal, (h) a pre-correction 1d, 1H, 1d1H, and 7d1H signal, (i) a pre-correction 0d0H, 0d0H, and 8d0H signal, and (j) a contour-corrected asymmetrical independent signal from (e) a pre-correction 4d, 4H, 4d4H, and 4d4H signal, in a post-correction signal, vertical contours and horizontal contours are individually reproduced for the outward and inward radial directions and there is almost no overshoot or undershoot. Thus, even if the rear edges of contours are individually degraded for the outward and inward radial directions, the contours can be individually corrected for the outward and inward radial directions.

Likewise, in FIG. 2B, by individually subtracting (a) a pre-correction 8d, 8H, 8d8H, and 0d8H signal, (b) a pre-correction 7d, 7H, 7d7H, and 1d7H signal, (c) a pre-correction 6d, 6H, 6d6H, and 2d6H signal, (d) a pre-correction 5d, 5H, 5d5H, and 3d5H signal, (f) a pre-correction 3d, 3H, 3d3H, and 5d3H signal, (g) a pre-correction 2d, 2H, 2d2H, and 6d2H signal, (h) a pre-correction 1d, 1H, 1d1H, and 7d1H signal, (i) a pre-correction 0d0H, 0d0H, and 8d0H signal, and (j) a contour-corrected asymmetrical independent signal from (e) a pre-correction 4d, 4H, 4d4H, and 4d4H signal, in a post-correction signal, vertical contours and horizontal contours are individually reproduced for the outward and inward radial directions and there is almost no overshoot or undershoot. Thus, even if the front edges of contours are individually degraded for the outward and inward radial directions, the contours can be individually corrected for the outward and inward radial directions.

Therefore, the imaging device can output a video signal where the front or rear edges of contours are individually corrected for the outward and inward radial directions while suppressing overshoot or undershoot, by the means (CPU 6) for generating, based on multi-scanning line delay vertical contour correction, multi-pixel delay horizontal contour correction, and information on the optical system including a lens and a catoptric system, such as the type information, focal length information, and aperture ratio information of the optical system including a lens and a catoptric system, information on a relationship between a location on the screen and contour correction control (a horizontal pixel number and the amounts of frequency correction for contour correction), taking into account that the way the contour edge is distorted in the centerward radial direction of the optical system including a lens and a catoptric system differs from the way the contour edge is distorted in the outward radial direction of the optical system including a lens and a catoptric system; means (the location-on-the-screen control unit 5 including a horizontal pixel counter) for individually calculating the amounts of correction for a left horizontal contour (5d to 8d contour) and a right horizontal contour (0d to 3d contour) and individually calculating the amounts of correction for an upper vertical contour (5H to 8H) and a lower vertical contour (0H to 3H), in proportion to a distance of a pixel corresponding to a video signal from the center of the screen (h–H/2 where H is the number of horizontal pixels and h is the horizontal pixel number), based on the generated information on a relationship for contour correction control and (a horizontal pixel number from the horizontal pixel counter based on) a horizontal synchronizing signal and a pixel clock; and means (negative multipliers N0 to N3 and N5 to N8 and positive multipliers P0 to P8) for individually performing vertical contour correction for the upper vertical contour (5H to 8H) and the lower vertical contour (0H to 3H) and individually performing horizontal contour correction for the left horizontal contour (5d to 8d contour) and the right horizontal contour (0d to 3d contour) of one embodiment of the present invention.

Second Embodiment

A second embodiment only describes differences from the first embodiment.

In the first embodiment, real-time processing of a video signal using pixel delay units and line memory units is described. On the other hand, in the second embodiment, as shown in FIGS. 1E, 1G, and 1H which are detailed block diagrams of contour correction circuits of one embodiment of the present invention, a contour correction signal is generated by the addition and subtraction of read signals from a frame memory unit (to individually perform oblique contour correction for inward and outward).

If a double-data-rate SDRAM (abbreviated as DDR) which is a frame memory unit and a field-programmable gate array (abbreviated as FPGA) which performs signal processing are high speed, serial operation by a single circuit is also possible for addition and subtraction.

Figure 1E:
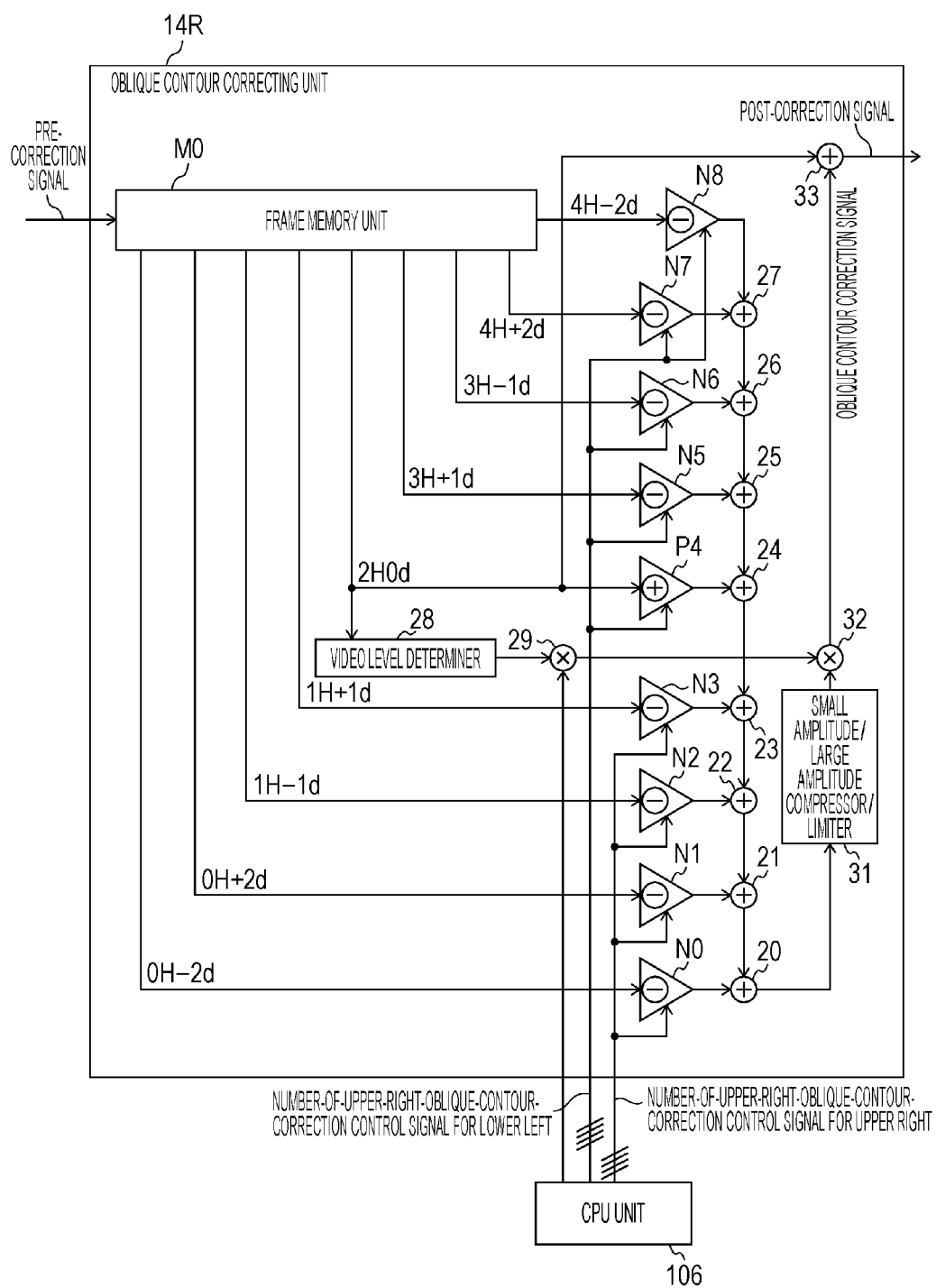
FIG. 1E is a block diagram of a multi-scanning line oblique contour correcting unit of one embodiment of the present invention.
Figure 1F:
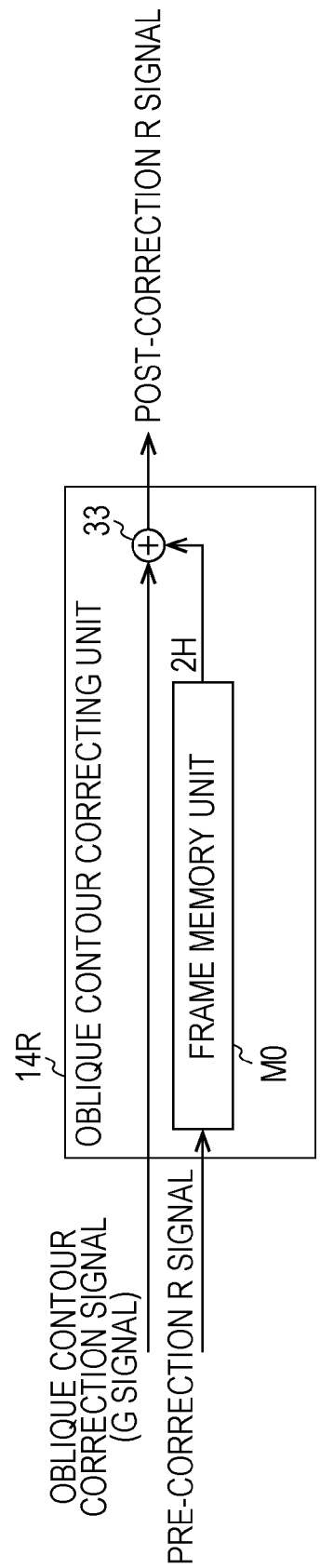
FIG. 1F is a block diagram of the multi-scanning line oblique contour correcting unit of one embodiment of the present invention.
Figure 1G:
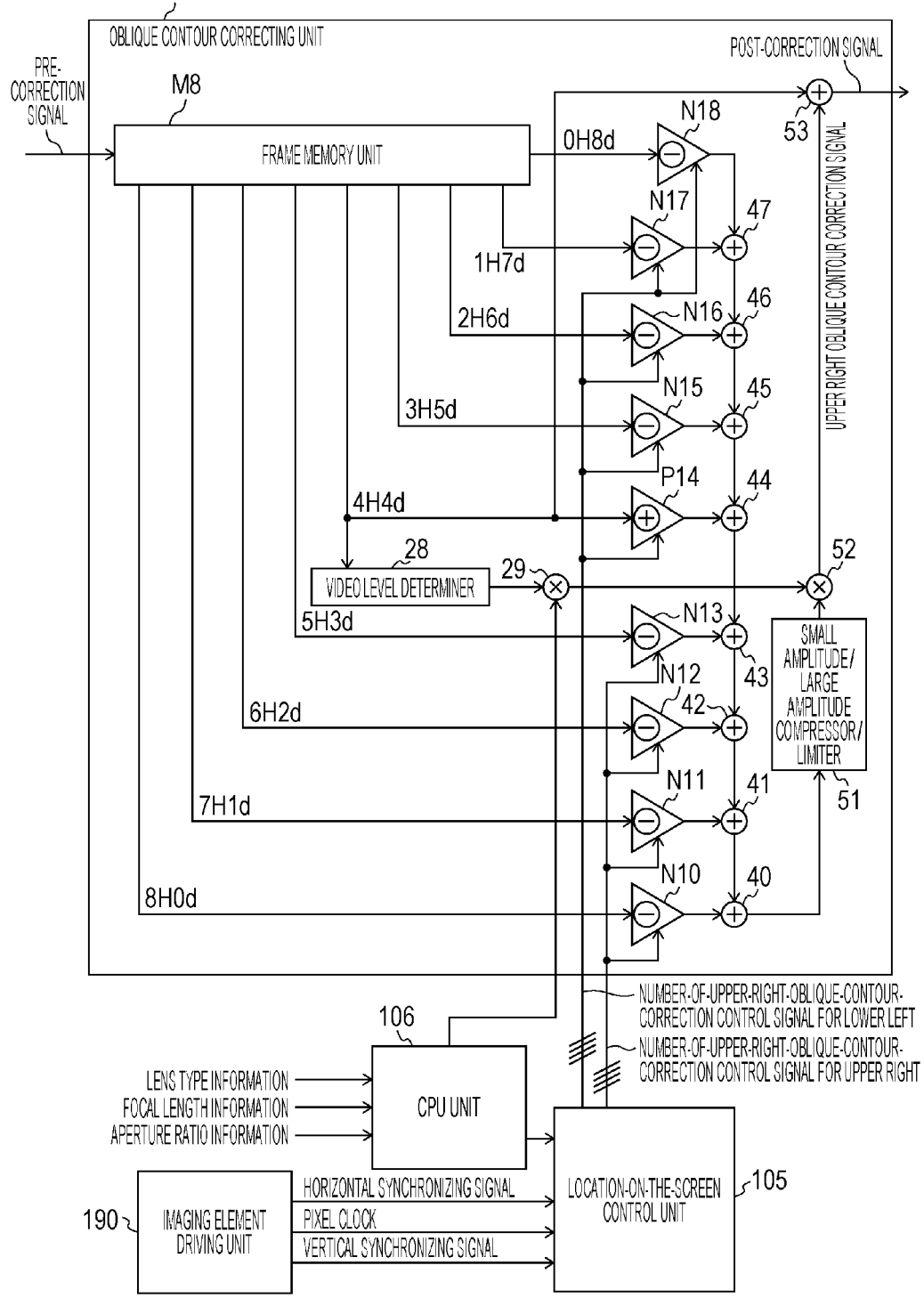
FIG. 1G is a block diagram of an upper right oblique contour correcting unit of one embodiment of the present invention.
Figure 1H:
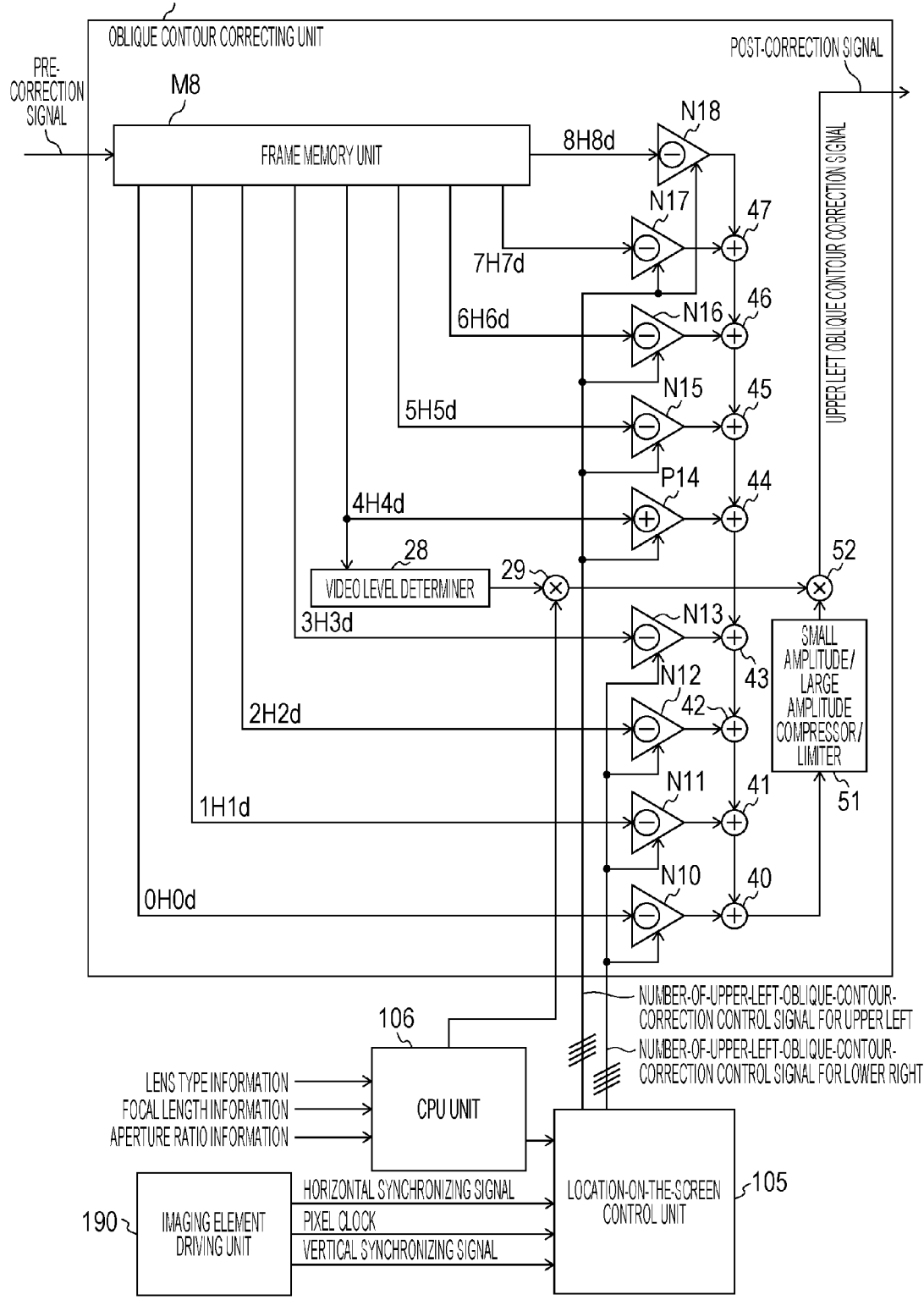
FIG. 1H is a block diagram of an upper left oblique contour correcting unit of one embodiment of the present invention.

That is, in the present invention, processing may be performed for a video signal read from a frame memory unit having stored therein a video signal for digital zoom, conversion of the number of scanning lines, etc., as shown in FIGS. 1E, 1G, and 1H.

An oblique contour correcting unit of the second embodiment includes an oblique contour correcting unit 14G, an oblique contour correcting unit 14R, and an oblique contour correcting unit 14B.

The oblique contour correcting unit 14G performs oblique contour correction on a G signal outputted from an interpolation processing unit, and outputs the resulting signal as a 4KG video signal.

The oblique contour correcting unit 14R performs oblique contour correction on an R signal outputted from the interpolation processing unit, and outputs the resulting signal as a 4KR video signal.

The oblique contour correcting unit 14B performs oblique contour correction on a B signal outputted from the interpolation processing unit, and outputs the resulting signal as a 4 KB video signal.

One embodiment where an oblique contour correction signal is generated will be described using FIGS. 1E, 1G, and 1H. FIGS. 1E, 1G, and 1H are block diagrams of multi-scanning line oblique contour correcting units of one embodiment of the present invention. The block diagram illustrated in FIG. 1E corresponds to obliques in two directions, which is explained by the diagram of FIG. 2C(a). The block diagram illustrated in FIG. 1G corresponds to an upper right oblique, which is explained by the diagram of FIG. 2C(b). The block diagram illustrated in FIG. 1H corresponds to an upper left oblique, which is explained by the diagram of FIG. 2C (c). Note that since the oblique contour correcting units for 14R, 14G, and 14B have the same configuration, in the description, correction is performed using the oblique contour correcting unit 14R as a representative example.

FIGS. 2C(a) to 2C(c) are diagrams for supplementary illustration of FIGS. 1E, 1G, and 1H.

Even if an oblique resolution and a modulation factor are reduced by oblique interpolation of G1 and G2 in a process of the interpolation processing unit of FIGS. 1E, 1G, and 1H, the oblique contour correcting unit can perform correction.

In FIG. 1E, the oblique contour correcting unit 14R reads 2H0d (video data) from a frame memory unit M0 as a pixel to be corrected, and outputs the video data to an adding unit 24 through an adding unit P4.

Since the oblique contour correcting unit 14R generates a left-up oblique contour correction signal for the 2H0d pixel, 0H−2d, 1H−1d, 3H+1d, and 4H+2d are read from the frame memory unit M0. Then, a subtracting unit N0 converts 0H−2d to a negative number and outputs the negative number to an adding unit 20, a subtracting unit N2 converts 1H−1d to a negative number and outputs the negative number to an adding unit 22, a subtracting unit N5 converts 3H+1d to a negative number and outputs the negative number to an adding unit 25, and a subtracting unit N7 converts 4H+2d to a negative number and outputs the negative number to an adding unit 27.

In addition, in order to generate, by the oblique contour correcting unit 14R, a right-up oblique contour correction signal for the 2H0d pixel, 0H+2d, 1H+1d, 3H−1d, and 4H−2d are read from the frame memory unit M0. Then, a subtracting unit N1 converts 0H+2d to a negative number and outputs the negative number to an adding unit 21, a subtracting unit N3 converts 1H+1d to a negative number and outputs the negative number to an adding unit 23, a subtracting unit N6 converts 3H−1d to a negative number and outputs the negative number to an adding unit 26, and a subtracting unit N8 converts 4H−2d to a negative number and outputs the negative number to the adding unit 27.

Note that a CPU unit 106 can control the levels of the adding unit P4 and the subtracting units N0, N1, N2, N3, N5, N6, N7, and N8.

Furthermore, in the oblique contour correcting unit 14R, the data inputted to the adding units 20 to 27 are added up, a small amplitude/large amplitude compressor/limiter 31 limits or compresses the data to a level in a predetermined range, a multiplying unit 32 amplifies or attenuates the data to a predetermined level and inputs the resulting data as an oblique contour correction signal to an adding unit 33, and the adding unit 33 adds the oblique contour correction signal to 2H0d which is a correction target signal, and outputs the resulting signal as a post-correction signal.

Note that the level of the oblique contour correction signal is controlled by the multiplying unit 32 such that a multiplying unit 29 multiplies a result of determination of the level of 2H0d, which is made by a video level determining unit 28, by a level control signal from the CPU unit 106, and inputs the resulting signal to the multiplying unit 32.

Note that the number of reads from the frame memory units M0 and M8 of FIGS. 1E, 1G, and 1H is not limited to nine and may be any larger natural number.

When the number of reads from the frame memory units M0 and M8 is not a large number, the number of reads from the frame memory units M0 and M8 is preferably 4N+1 (N is a natural number) so as to achieve symmetrical left and right oblique contour correction.

That is, for simple oblique contour correction, the number of reads from the frame memory units M0 and M8 may be five.

Third Embodiment

A third embodiment describes only differences from the first and second embodiments. In the third embodiment, the above-described high-resolution imaging device uses a circuit of FIG. 7 which is a block diagram (progressive scanning output) showing an example of interpolation signal processing according to another embodiment of the present invention, and uses a color separation optical system and three or more imaging elements, like FIG. 8 which is a flowchart showing an example of signal processing for 2160/60p (progressive scanning output) according to one embodiment of the present invention. The imaging device includes means for individually performing contour correction for the outward and inward radial directions (for at least blue) (to correct coma aberration and generate high-frequency luminance components using red, green and blue); and means for generating high-frequency components of a luminance signal using pixel signals of all colors (red, green, and blue) (using not only red and green, but also blue). Even if optical low-pass filters are set to a high frequency, since pixel signals of all colors (red, green, and blue) are used, the occurrence of moire is very little. In particular, in the present invention, the high-resolution imaging device includes an on-chip color filter imaging element or includes a color separation optical system and four or more imaging elements, and uses RG1G2B as the spatial locations of a Bayer pattern. The above-described optical system including a lens and a catoptric system is corrected for chromatic aberration at three wavelengths and corrected for spherical aberration and coma aberration at two wavelengths. The imaging device includes means for individually performing contour correction for the outward and inward radial directions (for at least blue); and means for generating high-frequency components of a luminance signal, using all pixel signals (using not only RG1G2 but also blue) at the grid-like spatial locations of the RG1G2B Bayer pattern. Even if the optical low-pass filters are set to a high frequency, since all pixel signals at the grid-like spatial locations of the RG1G2B Bayer pattern are used, the occurrence of moire is particularly very little.

In the third embodiment, in an imaging device including a color separation optical system and four imaging elements of R (red), G (green)1, G2, and B (blue), the G2 imaging element is disposed so as to be shifted from the G1 imaging element by a half pixel pitch in a vertical direction and by a half pixel pitch in a horizontal direction, the R imaging element is disposed at the same location in the vertical direction as the G1 imaging element and at the same location in the horizontal direction as the G2 imaging element, and the B imaging element is disposed at the same location in the vertical direction as the G2 imaging element and at the same location in the horizontal direction as the G1 imaging element; or the R imaging element is disposed at the same location in the vertical direction as the G2 imaging element and at the same location in the horizontal direction as the G1 imaging element, and the B imaging element is disposed at the same location in the vertical direction as the G1 imaging element and at the same location in the horizontal direction as the G2 imaging element, a low-frequency component of an R output video signal is a signal of the R imaging element, a low-frequency component of a B output video signal is a signal of the B imaging element, and a low-frequency component of a G output video signal is an average value of a signal of the G1 imaging element and a signal of the G2 imaging element, in a case of at least low-sensitivity setting (studio use such as −3 dB, −6 dB, −9 dB, or −12 dB, and RB both have high S/N), an electrically high color temperature (6800 K, 5600 K, 4800K, etc.), or an average ratio of (ambient) B/(G1+G2) being not small (0.5 or more, etc.), an alternating signal of a signal of the G2 imaging element and a signal of the B imaging element is used as a high-frequency signal for the even-numbered scanning lines, in a case of an average ratio of (ambient) R/(G1+G2) being not small (0.5 or more, etc.), an alternating signal of a signal of the G1 imaging element and a signal of the R imaging element is used as a high-frequency signal for the odd-numbered scanning lines, in a case of at least high-sensitivity setting (monitoring use such as +18 dB, +24 dB, +36 dB, +48 dB, and +60 dB), an electrically low color temperature (3200 K, 2800 K, etc.), or an average ratio of (ambient) B/(G1+G2) being small (0.5 or less, etc.), an alternating signal of a signal of the G1 imaging element and a signal of the G2 imaging element is used as a high-frequency signal for the even-numbered scanning lines, and in a case of an average ratio of R/(G1+G2) being small (0.5 or less, etc.) or a case of left and right screen edges, an alternating signal of a signal of the G1 imaging element and a signal of the G2 imaging element is used as a high-frequency signal for the odd-numbered scanning lines.

Figure 7:
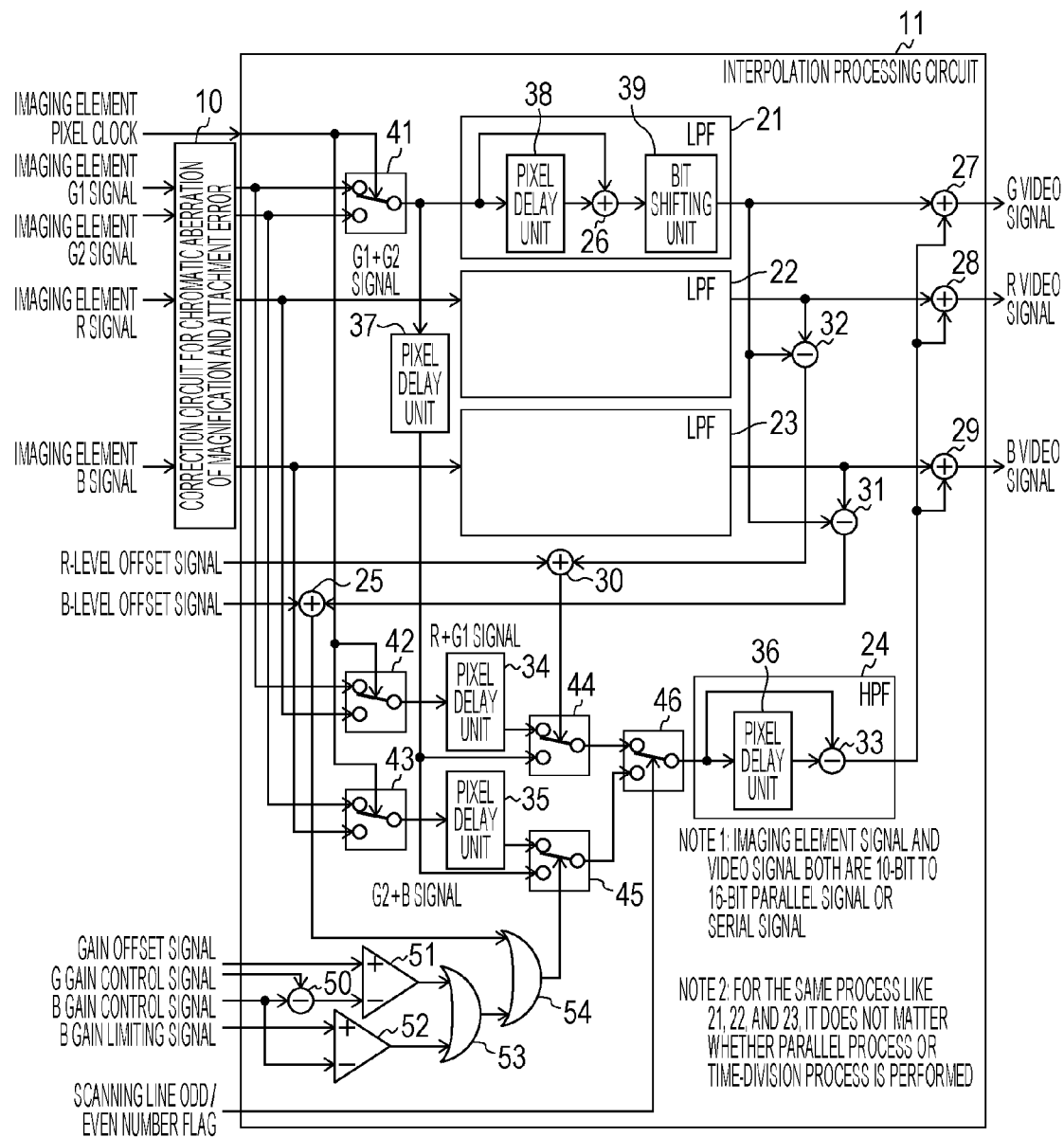
FIG. 7 is a block diagram showing an example of interpolation signal processing according to another embodiment of the present invention (progressive scanning output).

In FIG. 7 which is a block diagram showing an example of signal processing for 2160/60p (progressive scanning output) according to one embodiment of the present invention, 11 indicates an interpolation processing circuit, 21, 22, and 23 indicate a low-pass filter (LPF), 24 indicates a high-pass filter (HPF), 25, 26, 27, 28, 29, and 30 indicate an adder, 31, 32, and 33 indicate a subtractor, 34, 35, 36, 37, and 38 indicate a pixel delay device, 39 indicates a bit shifting unit, and 41, 42, 43, 44, 45, and 46 indicate a selector.

The detailed configuration and operation will be described below. In FIG. 4 which is a block diagram showing an exemplary configuration of an imaging device according to one embodiment of the present invention, incident light converged by the optical system 1 including a lens and a catoptric system is color-separated into R (red), G (green)1, G2, and B (blue) by a color separation optical system 5 for four imaging elements in the imaging device 2. By a first green (G1) imaging element 3G1, a second green (G2) imaging element 3G2, a red (R) imaging element 3R, and a blue (B) imaging element 3B which are CMOS imaging elements where peripheral circuits are integrated or CCD imaging elements where peripheral circuits are integrated, the color-separated lights become four sets of 1080/60p imaging signals. The signals are converted to 2160/60p (progressive scanning output) or 2160/60i (interlaced scanning output) by the signal processing unit 4 including an interpolation processing circuit composed of an FPGA controlled by the CPU 6.

In FIG. 4 which is a block diagram showing an exemplary configuration of an imaging device according to one embodiment of the present invention, FIG. 6A which is a schematic diagram showing the attachment locations of the imaging elements in the imaging device according to one embodiment of the present invention, FIG. 7 which is a block diagram showing an example of signal processing for 2160/60p (progressive scanning output) according to one embodiment of the present invention, interpolation processing circuit 11 includes a ½ frequency divider that frequency-divides an imaging element pixel clock.

The interpolation processing circuit 11 includes a G1 imaging element 3G1 and a G2 imaging element 3G2 disposed so as to be shifted from the G1 imaging element 3G1 by a half pixel pitch in a vertical direction and by a half pixel pitch in a horizontal direction; a first selector 41 that alternately selects a signal of the G1 imaging element 3G1 and a signal of the G2 imaging element 3G2 (by a ½ frequency-divided clock of the imaging element pixel clock); a first low-pass filter (hereinafter, LPF) 21 that allows the low-frequency components of an output signal from the first selector 41 to pass therethrough; a first determiner that binarizes an output signal from the first LPF 21; and a first pixel delay unit 37 that delays the output signal from the first selector 41.

The interpolation processing circuit 11 includes either one of:

an R imaging element 3R disposed so as to be at the same location in the vertical direction as the G1 imaging element 3G1 and to be shifted by a half pixel pitch in the horizontal direction from the G1 imaging element 3G1, and a B imaging element 3B disposed so as to be shifted by a half pixel pitch in the vertical direction from the G1 imaging element 3G1 and to be at the same location in the horizontal direction as the G1 imaging element 3G1; a second selector 42 that alternately selects a signal of the G1 imaging element 3G1 and a signal of the R imaging element 3R; a second pixel delay unit 34 that delays an output signal from the second selector 42; a third selector 43 that alternately selects a signal of the G2 imaging element 3G2 and a signal of the B imaging element 3B; and a third pixel delay unit 35 that delays an output signal from the third selector 43; and a B imaging element 3B disposed so as to be at the same location in the vertical direction as the G1 imaging element 3G1 and to be shifted by a half pixel pitch in the horizontal direction from the G1 imaging element 3G1, and an R imaging element 3R disposed so as to be shifted by a half pixel pitch in the vertical direction from the G1 imaging element 3G1 and to be at the same location in the horizontal direction as the G1 imaging element 3G1; the second selector 42 that alternately selects a signal of the G1 imaging element 3G1 and a signal of the B imaging element 3B; the second pixel delay unit 34 that delays an output signal from the second selector 42; the third selector 43 that alternately selects a signal of the G2 imaging element 3G2 and a signal of the R imaging element 3R; and the third pixel delay unit 35 that delays an output signal from the third selector 43, and includes a second LPF 22 that allows the low-frequency components of the signal of the R imaging element 3R to pass therethrough; a third LPF 23 that allows the low-frequency components of the signal of the B imaging element 3B to pass therethrough; a first subtractor 32 that computes a difference between an output from the first LPF 21 and an output from the second LPF 22; and a first adder 30 that adds an R/(G1+G2) average ratio offset signal that offsets a selection with an R/(G1+G2) average ratio, to an output from the first subtractor 32.

Here, upon implementation of an FPGA for the same process like the LPFs 21, 22, and 23, it does not matter whether a low-speed parallel process with reduced power consumption or a time-division process with a reduced number of gates is performed.

The interpolation processing circuit 11 includes at least one of:

a combination of a second subtractor 31 that computes a difference between an output from the first LPF 21 and an output from the third LPF 23, and a second adder 25 that adds a B/(G1+G2) average ratio offset signal that offsets a selection with a B/(G1+G2) average ratio, to an output from the second subtractor 31; and a combination of a B gain control signal that controls the gain of a B imaging element signal or the gain of a B video signal and a G gain control signal that controls the gain of a G imaging element signal or the gain of a G video signal, a subtractor 50 that computes a difference between the B gain control signal and the G gain control signal, and the second adder 26 that adds a gain offset signal that offsets a selection with the gain, to an output from the subtractor 50, and includes a fifth selector 44 that selects a (G1+G2) output signal from the first pixel delay unit 37 and a (G1+R) output signal from the second pixel delay unit 34 by an output signal from the first adder 30; a sixth selector 45 that selects a (G1+G2) output signal from the first pixel delay unit 37 and a (G2+B) output signal from the third pixel delay unit 35 by an output signal from the second adder 25; a seventh selector 46 that selects an output signal from the fifth selector 44 and an output signal from the sixth selector 45 by a scanning line odd/even number flag signal; and a high-pass filter (hereinafter, HPF) 24 that allows the high-frequency components of an output signal from the seventh selector 46 to pass therethrough, and includes a fourth adder 27, a fifth adder 28, and a sixth adder 29 that add an output signal from the HPF 24 to an output signal from the first LPF 21, an output signal from the second LPF 22, and an output signal from the third LPF 23.

In addition, in the low-pass filters (LPFs) 21, 22, and 23 in the interpolation processing circuit 11 of FIG. 7 which are block diagrams showing examples of signal processing according to one embodiment of the present invention, as shown in the LPF 21, a low-pass filter is implemented by a pixel delay unit 38, an adder 26, and a bit shifting unit 39.

Furthermore, in the high-pass filter (HPF) 24 in the interpolation processing circuit 11 of FIG. 7 which are block diagrams showing examples of signal processing according to one embodiment of the present invention, a high-pass filter is implemented by a pixel delay unit 36 and a subtractor 33.

In FIG. 7 which is a block diagram showing an example of signal processing for 2160/60p (progressive scanning output) according to one embodiment of the present invention, 33 and 50 indicate a subtractor, 51 and 52 indicate a comparator, and 53 and 54 indicate a logical OR, and when the B gain is less than or equal to a B gain limiting signal, regardless of the G gain, a G2+B signal is used a high-frequency signal for the even-numbered scanning lines.

Furthermore, the R, G1, G2, and B imaging elements which are attached in the manner shown in FIG. 6A which is a schematic diagram showing the attachment locations of the imaging elements in the imaging device according to one embodiment of the present invention are allowed to perform progressive scanning. In addition, in an example of signal processing for 2160/60i (interlaced scanning output) according to one embodiment of the present invention, the interpolation processing circuit 11 includes an adder which is means for adding the above-described high-frequency signal for the even-numbered scanning lines to the above-described high-frequency signal for the odd-numbered scanning lines; the high-pass filter (HPF) 24; and the adders 27, 28, and 29 which are means for adding an output signal from the above-described means for adding, to output video signals for interlaced scanning.

Figure 8:
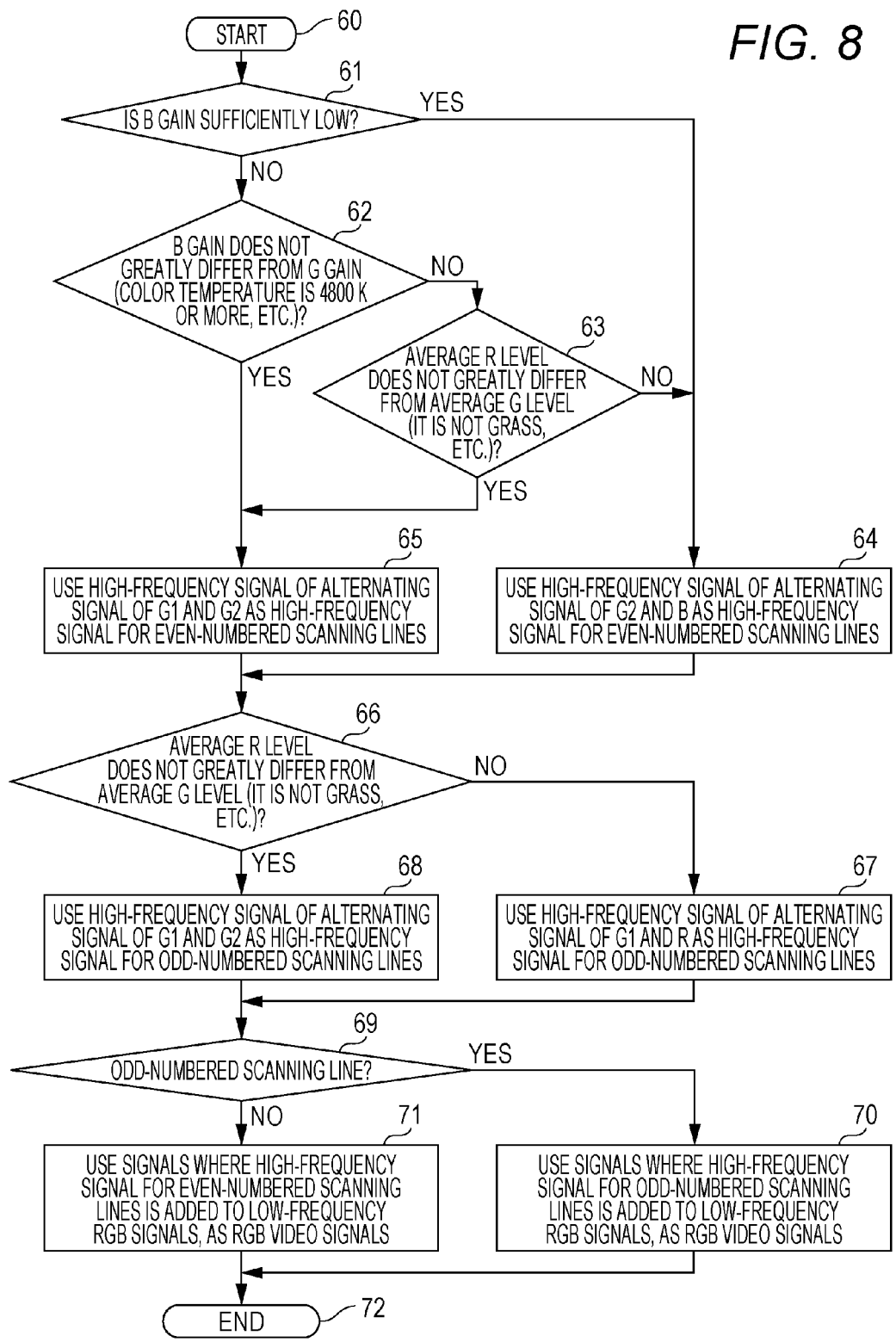
FIG. 8 is a flowchart showing an example of signal processing for 2160/60p (progressive scanning output) according to one embodiment of the present invention.

In FIG. 8 which is a flowchart showing an example of signal processing according to one embodiment of the present invention, 60 indicates "start", 61 indicates "whether the B gain is sufficiently low", 62 indicates "whether the B gain does not greatly differ from the G gain (the color temperature is 4800 K or more, etc.)", 63 indicates "whether the average R level does not greatly differ from the average G level (it is not the grass, etc.)", 64 indicates that "a high-frequency signal of an alternating signal of G2 and B is used as a high-frequency signal for the even-numbered scanning lines", 65 indicates that "a high-frequency signal of an alternating signal of G1 and G2 is used as a high-frequency signal for the even-numbered scanning lines", 66 indicates "whether the average R level does not greatly differ from the average G level (it is not the grass, etc.)", 67 indicates that "a high-frequency signal of an alternating signal of G1 and R is used as a high-frequency signal for the odd-numbered scanning lines", 68 indicates that "a high-frequency signal of an alternating signal of G1 and G2 is used as a high-frequency signal for the odd-numbered scanning lines", and 72 indicates "end".

Here, in FIG. 8 which is a flowchart, it does not matter whether the processes 61, 62, 63, 64, and 65 or the processes 66, 67, and 68 are performed first.

In FIG. 8 which is a flowchart showing an example of signal processing for 2160/60p (progressive scanning output) according to one embodiment of the present invention, 69 indicates "whether it is an odd-numbered scanning line", 70 indicates that "signals where the high-frequency signal for the odd-numbered scanning lines is added to low-frequency RGB signals are used as RGB video signals", and 71 indicates that "signals where the high-frequency signal for the even-numbered scanning lines is added to low-frequency RGB signals are used as RGB video signals".

In an example of signal processing for 2160/60i (interlaced scanning output) according to one embodiment of the present invention, the indication of block 71 in FIG. 8 corresponds to that "signals where the high-frequency signal for the even-numbered scanning lines and the high-frequency signal for the odd-numbered scanning lines are added to low-frequency RGB signals are used as RGB video signals".

In the present invention, the numbers of subtractors, line memory units, and pixel delay units of FIGS. 1A to 1D which are detailed block diagrams of contour correction circuits of one embodiment of the present invention are not limited to seven, and may be any larger natural number provided that the circuit size allows such placement.

When the numbers of adders, line memory units, and pixel delay units are not greater than or equal to seven, the numbers of adders, line memory units, and pixel delay units are preferably even numbers so as to achieve symmetrical contour correction.

That is, for simple individual horizontal contour (modulation factor) correction and vertical contour (modulation factor) correction, the number of reads from the frame memory unit is preferably four or six.

This application claims priority to Japanese Patent Application No. 2014-196595 filed Sep. 26, 2014, the entire content of which is incorporated herein by reference.

INDUSTRIAL APPLICABILITY

A solid-state imaging device of the present invention can output a video signal having been subjected to contour correction with suppressed overshoot and undershoot, even if an imaging element only outputs a video signal where the way the contour is distorted significantly differs between the centerward and receding directions due to blue coma (comet-like) aberration remaining in an apochromatic lens which is named by Abbe and which is corrected for chromatic aberration at three wavelengths and corrected for spherical aberration and coma aberration at two wavelengths or due to coma aberration of the wide-angle or telephoto end of a high-power zoom lens or a generic zoom lens or a reflex lens for a single-lens reflex camera.

In addition, to correct coma aberration, a UHDTV with a landscape aspect ratio such as 16:9 calculates the amounts of correction in proportion to a distance from the center of a screen (h–H/2), individually calculates the amounts of correction for a left horizontal contour (5d to 8d contour) and a right horizontal contour (0d to 3d contour), individually calculates the amounts of correction for an upper vertical contour (5H to 8H) and a lower vertical contour (0H to 3H), individually performs vertical contour correction for the upper vertical contour (5H to 8H) and the lower vertical contour (0H to 3H), and individually performs horizontal contour correction for the left horizontal contour (5d to 8d contour) and the right horizontal contour (0d to 3d contour).

As a result, on the periphery of the screen where coma aberration proportional to the first power of the viewing angle to be corrected, (in order to perform outward, one-direction contour correction) the imaging device makes the left and right horizontal contour correction variable independently. Particularly, a 4K8K UHDTV with a landscape screen can implement relay broadcasting which is performed with the wide-angle or telephoto end of a ⅔", 99× high-power zoom lens, etc., or with a reflex lens for a single-lens reflex camera. Alternatively, an imaging device that achieves, even without OLPFs, a reduction in moire by using also blue for a (high-frequency) luminance signal is implemented, enabling to put affordable UHDTVs into commercial production. Hence, coma aberration of the wide-angle or telephoto end of a high-power zoom lens or a generic zoom lens or a reflex lens for a single-lens reflex camera is also electronically corrected in a video signal.

REFERENCE SIGNS LIST

1: Optical system including a lens and a catoptric system (particularly, a high-power zoom lens and a reflex lens), 2: Imaging unit, 3 and 7: Imaging device, 4: Signal processing unit with a function of being able to individually change contour correction (such as vertical contour correction, horizontal contour correction, or oblique contour correction), 5: Location-on-the-screen control unit including a horizontal pixel counter, 6: CPU, 8: Signal processing unit with a function of being able to individually change contour enhancement for a centerward direction and a receding direction, 20 to 27 and 40 to 47: Adder, 28 and 48: Video level determiner, 31 and 51: Small amplitude/large amplitude compressor/limiter, 29, 49, 32, and 52: Multiplier, M0 to M7: Line memory unit, M8: Frame memory unit, D0 to D7: Pixel delay unit, N0 to N3, N5 to N8, N10 to N13, and N15 to N18: Negative multiplier, P0 to P8 and P10 to P18: Positive multiplier, 11: Interpolation processing circuit, 21, 22, and 23: Low-pass filter (LPF), 24: High-pass filter (HPF), 25, 26, 27, 28, 29, 30, and 47: Adder, 31, 32, 33, and 50: Subtractor, 34, 35, 36, 37, and 38: Pixel delay device, 39: Bit shifting unit, 41, 42, 43, 44, 45, and 46: Selector, 51 and 52: Comparator, and 53 and 54: Logical OR

The invention claimed is:
1. An imaging method for a high-resolution imaging device, comprising:
    using an optical system that includes a lens and a catoptric system;

obtaining type information and aperture ratio information of the optical system;
obtaining and storing coma aberration information of the optical system including a lens and a catoptric system;
using at least one of multi-stage horizontal contour correction, multi-stage vertical contour correction, or multi-stage oblique contour correction; and
performing at least one individual contour correction for outward and inward radial directions based on the obtained type information and aperture ratio information of the optical system and the stored coma aberration information,
wherein the at least one individual contour correction is selected from:
  individual and independent calculation of amounts of left and right horizontal contour correction and individual and independent performing of left and right horizontal contour correction,
  individual and independent calculation of amounts of upper and lower vertical contour correction and individual and independent performing of upper and lower vertical contour correction, and
  individual and independent calculation of amounts of upper left, lower right, upper right, and lower left oblique contour correction and individual and independent performing of upper left, lower right, upper right, and lower left oblique contour correction.

2. The imaging method according to claim 1, further comprising performing at least one of:
  obtaining focal length information of a zoom lens using multi-stage horizontal contour correction, and individually and independently calculating amounts of left and right horizontal contour correction and individually and independently performing left and right horizontal contour correction, wherein the individual contour correction for outward and inward radial directions, based on the obtained type information, focal length information, and aperture ratio information of the zoom lens and the stored coma aberration information, the high-resolution imaging device being a wide aspect ratio imaging device, and the optical system being the zoom lens corrected for chromatic aberration at three wavelengths;
  using multi-stage horizontal contour correction, and individually and independently calculating amounts of left and right horizontal contour correction and individually and independently performing left and right horizontal contour correction, wherein the individual contour correction for outward and inward radial directions, based on the obtained type information of a reflex lens and the stored coma aberration information, the high-resolution imaging device being a wide aspect ratio imaging device, and the optical system being the reflex lens;
  performing the individual contour correction for outward and inward radial directions for at least blue, and generating high-frequency components of a luminance signal using all pixel signals at grid-like spatial locations of an RG1G2B Bayer pattern, the high-resolution imaging device using an on-chip color filter imaging element or using a color separation optical system and four or more imaging elements, and using RG1G2B as the spatial locations of a Bayer pattern, and the color separation optical system being corrected for chromatic aberration at three wavelengths and corrected for spherical aberration and coma aberration at two wavelengths;
  performing the individual contour correction for outward and inward radial directions, and generating high-frequency components of a luminance signal using pixel signals of all colors including red, green, and blue, the high-resolution imaging device using the color separation optical system and three or more imaging elements; and
  using multi-pixel delay horizontal contour correction and multi-scanning line delay vertical contour correction, using the optical system corrected for chromatic aberration at three wavelengths, obtaining type information, focal length information, and aperture ratio information of the optical system, obtaining and storing at least blue coma aberration information of the optical system, and individually and independently calculating amounts of left and right horizontal contour correction in proportion to a distance from a center of a screen and individually and independently performing left and right horizontal contour correction, and individually and independently calculating amounts of upper and lower vertical contour correction in proportion to the distance from the center of the screen and individually and independently performing upper and lower vertical contour correction, based on the obtained type information, focal length information, and aperture ratio information of the optical system and the stored at least blue coma aberration information.

3. An imaging device comprising:
an optical system including a lens and a catoptric system, wherein the optical system obtains type information, aperture ratio information, and coma aberration information, and stores the obtained coma aberration information, and
  wherein the imaging device is a high-resolution imaging device;
a processor that performs at least one of multi-stage horizontal contour correcting, multi-stage vertical contour correcting, and multi-stage oblique contour correcting; and
a processor that performs at least one of: individually performing contour correction for outward and inward radial directions based on the obtained type information and aperture ratio information of the optical system and the stored coma aberration information, the processor being selected from: a processor that individually and independently calculates amounts of left and right horizontal contour correction and individually and independently performs left and right horizontal contour correction; a processor that individually and independently calculates amounts of upper and lower vertical contour correction and individually and independently performs upper and lower vertical contour correction; and a processor that individually and independently calculates amounts of upper left, lower right, upper right, and lower left oblique contour correction and individually and independently performs upper left, lower right, upper right, and lower left oblique contour correction.

4. The imaging device according to claim 3, comprising a processor that performs at least one of:
  obtaining focal length information of a zoom lens, performing multi-stage horizontal contour correction, and individually and independently calculating amounts of left and right horizontal contour correction and individually and independently performing left and right horizontal contour correction, wherein the contour correction for outward and inward radial directions, based on the obtained type information, focal length information, and aperture ratio information of the zoom lens and the stored coma aberration information, the high-resolution imaging device being a wide aspect ratio imaging device, and the optical system being the zoom lens corrected for chromatic aberration at three wavelengths;

performing multi-stage horizontal contour correcting, and individually and independently calculating amounts of left and right horizontal contour correction and individually and independently performing left and right horizontal contour correction, wherein the contour correction for outward and inward radial directions, based on the obtained type information of a reflex lens and the stored coma aberration information, the high-resolution imaging device being a wide aspect ratio imaging device, and the optical system being the reflex lens;

individually performing the contour correction for outward and inward radial directions for at least blue, and generating high-frequency components of a luminance signal using all pixel signals at grid-like spatial locations of an RG1G2B Bayer pattern, the high-resolution imaging device including an on-chip color filter imaging element or including a color separation optical system and four or more imaging elements, and using RG1G2B as the spatial locations of a Bayer pattern, and the optical system including a lens and a catoptric system being corrected for chromatic aberration at three wavelengths and corrected for spherical aberration and coma aberration at two wavelengths;

individually performing the contour correction for outward and inward radial directions, and generating high-frequency components of a luminance signal using pixel signals of all colors including red, green, and blue, the high-resolution imaging device using a color separation optical system and three or more imaging elements; and multi-pixel delay horizontal contour correcting, multi-scanning line delay vertical contour correcting, the optical system corrected for chromatic aberration at three wavelengths, obtaining type information, focal length information, and aperture ratio information of the optical system, obtaining and storing at least blue coma aberration information of the optical system, individually and independently calculating amounts of left and right horizontal contour correction in proportion to a distance from a center of a screen and individually and independently performing left and right horizontal contour correction, based on the obtained type information, focal length information, and aperture ratio information of the optical system including a lens and a catoptric system and the stored at least blue coma aberration information, and individually and independently calculating amounts of upper and lower vertical contour correction in proportion to the distance from the center of the screen and individually and independently performing upper and lower vertical contour correction, based on the obtained type information, focal length information, and aperture ratio information of the optical system and the stored at least blue coma aberration information.

5. An imaging device comprising:

a processor that performs multi-stage horizontal contour correction and vertical contour correction, wherein the imaging device is a wide aspect ratio, high-resolution imaging device; and an optical system including a lens and a catoptric system corrected for chromatic aberration at three wavelengths;

wherein the processor further performs obtaining type information, focal length information, and aperture ratio information of the optical system including a lens and a catoptric system, obtaining and storing coma aberration information appropriate to a focal length and an aperture ratio of the optical system including a lens and a catoptric system, individually calculating amounts of correction for left and right horizontal contours and individually calculating amounts of correction for upper and lower vertical contours, in proportion to a distance of a pixel corresponding to a video signal from a center of a screen, based on information on a relationship for contour correction control, a horizontal synchronizing signal, and a pixel clock, the information on a relationship being generated taking into account that a way a contour is distorted due to coma aberration of the optical system including a lens and a catoptric system differs between outward and inward radial directions, and based on the obtained type information, focal length information, and aperture ratio information of the optical and the stored coma aberration information; and individually performing vertical contour correction for the upper and lower vertical contours and individually performing horizontal contour correction for the left and right horizontal contours.

\* \* \* \* \*